US009766861B2

(12) United States Patent
Savliwala et al.

(10) Patent No.: US 9,766,861 B2
(45) Date of Patent: *Sep. 19, 2017

(54) STATE-SPECIFIC EXTERNAL FUNCTIONALITY FOR SOFTWARE DEVELOPERS

(71) Applicant: Quixey, Inc., Mountain View, CA (US)

(72) Inventors: Taher Savliwala, Mountain View, CA (US); Eric Chen, Sunnyvale, CA (US); Jonathan Ben-Tzur, Sunnyvale, CA (US)

(73) Assignee: Quixey, Inc., Mountain View, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/588,351

(22) Filed: Dec. 31, 2014

(65) Prior Publication Data

US 2016/0085521 A1    Mar. 24, 2016

Related U.S. Application Data

(60) Provisional application No. 62/054,237, filed on Sep. 23, 2014.

(51) Int. Cl.
*G06F 9/44* (2006.01)
*H04L 29/08* (2006.01)
(Continued)

(52) U.S. Cl.
CPC .............. *G06F 8/34* (2013.01); *G06F 3/0482* (2013.01); *G06F 3/04842* (2013.01); *G06F 8/10* (2013.01);
(Continued)

(58) Field of Classification Search
CPC ........................................................ G06F 8/34
(Continued)

(56) References Cited

U.S. PATENT DOCUMENTS 7,673,327 B1 *  3/2010  Polis ................... G06F 17/3089
                                                            713/151
8,321,847 B1 * 11/2012  Garvin ...................... G06F 8/31
                                                            717/108
(Continued)

FOREIGN PATENT DOCUMENTS

WO    WO-03062946       7/2003
WO    WO-2013059605 A1  4/2013

OTHER PUBLICATIONS

International Search Report and Written Opinion for PCT Application No. PCT/US2015/051751, dated Mar. 24, 2016.
(Continued)

*Primary Examiner* — Lewis A Bullock, Jr.
*Assistant Examiner* — Theodore Hebert
(74) *Attorney, Agent, or Firm* — Harness, Dickey & Pierce, P.L.C.

(57) ABSTRACT

A system includes a user interface presented to a developer. The developer selects a first function to supplement functionality of a first application with external functionality available from third party applications. A code generation module provides a software object to the developer for incorporation into a first state of the first application. The first state includes a user interface element associated with an entity. User selection of the user interface element initiates preparation of a query wrapper including a combination of the entity's name and a predefined text string corresponding to the first function. The query wrapper is transmitted to a search system and a result set is received and displayed. A first item of the result set includes an access mechanism for a specified state of a target application. User selection of the first item causes the access mechanism to open the target application to the specified state.

36 Claims, 18 Drawing Sheets

(51) Int. Cl.
*G06F 3/0482* (2013.01)
*G06F 3/0484* (2013.01)
*G06Q 30/02* (2012.01)
*G06F 17/30* (2006.01)
*H04W 4/00* (2009.01)
*H04L 29/06* (2006.01)
*G06F 9/445* (2006.01)

(52) U.S. Cl.
CPC ............ *G06F 8/36* (2013.01); *G06F 17/3087* (2013.01); *G06F 17/30112* (2013.01); *G06F 17/30867* (2013.01); *G06Q 30/0273* (2013.01); *H04L 67/02* (2013.01); *H04L 67/04* (2013.01); *H04L 67/10* (2013.01); *H04L 67/125* (2013.01); *H04L 67/20* (2013.01); *H04L 67/42* (2013.01); *H04W 4/001* (2013.01); *H04W 4/003* (2013.01); *G06F 8/61* (2013.01)

(58) Field of Classification Search
USPC ........................................................ 717/108
See application file for complete search history.

(56) References Cited

U.S. PATENT DOCUMENTS

| | | | | |
|---|---|---|---|---|
| 2003/0043192 | A1* | 3/2003 | Bouleau | G06F 9/4443 715/762 |
| 2003/0182196 | A1* | 9/2003 | Huang | G06Q 30/02 705/26.64 |
| 2005/0160104 | A1* | 7/2005 | Meera | G06F 8/20 |
| 2012/0166276 | A1* | 6/2012 | Chitnis | G06Q 30/0251 705/14.49 |
| 2012/0233567 | A1* | 9/2012 | Brown | G06F 9/445 715/810 |
| 2012/0284247 | A1* | 11/2012 | Jiang | G06F 17/30867 707/706 |
| 2012/0311526 | A1* | 12/2012 | DeAnna | G06F 8/60 717/106 |
| 2013/0290319 | A1* | 10/2013 | Glover | G06F 17/3053 707/723 |
| 2014/0129265 | A1* | 5/2014 | Arena | G06Q 50/14 705/5 |
| 2014/0172840 | A1* | 6/2014 | Kumar | G06F 17/30867 707/723 |
| 2014/0282358 | A1* | 9/2014 | Mowatt | G06F 8/70 717/104 |
| 2014/0282398 | A1* | 9/2014 | Podolyak | G06F 8/71 717/121 |
| 2015/0154644 | A1* | 6/2015 | Saxena | G06Q 30/0269 705/14.66 |
| 2016/0085514 | A1* | 3/2016 | Savliwala | H04W 4/00 705/14.69 |
| 2016/0085515 | A1* | 3/2016 | Ben-Tzur | G06F 8/20 717/109 |
| 2016/0085516 | A1* | 3/2016 | Ben-Tzur | G06F 8/34 717/109 |
| 2016/0085521 | A1* | 3/2016 | Savliwala | H04W 4/00 717/108 |
| 2016/0103693 | A1* | 4/2016 | Berlin | G06F 13/102 719/327 |

OTHER PUBLICATIONS

International Search Report and Written Opinion for PCT Application No. PCT/US2015/051762, dated Mar. 18, 2016.
Hindman, Nate; URX Arrives on the Web; URX Blog; Jan. 15, 2015.
Lawler, Ryan; TechCrunch; Button Raises $12 Million From Redpoint to Deep Link All Your Apps; Jan. 22, 2015.
Stephen Robertson, (2004) "Understanding Inverse Document Frequency: on Theoretical Arguments for IDF," Journal of Documentation, vol. 60 Iss: 5, pp. 503-520.
U.S. Appl. No. 14/588,310, filed Dec. 31, 2014, Taher Savliwala.
U.S. Appl. No. 14/683,004, filed Apr. 9, 2015, Jonathan Ben-Tzur.
U.S. Appl. No. 14/683,020, filed Apr. 9, 2015, Jonathan Ben-Tzur.

* cited by examiner

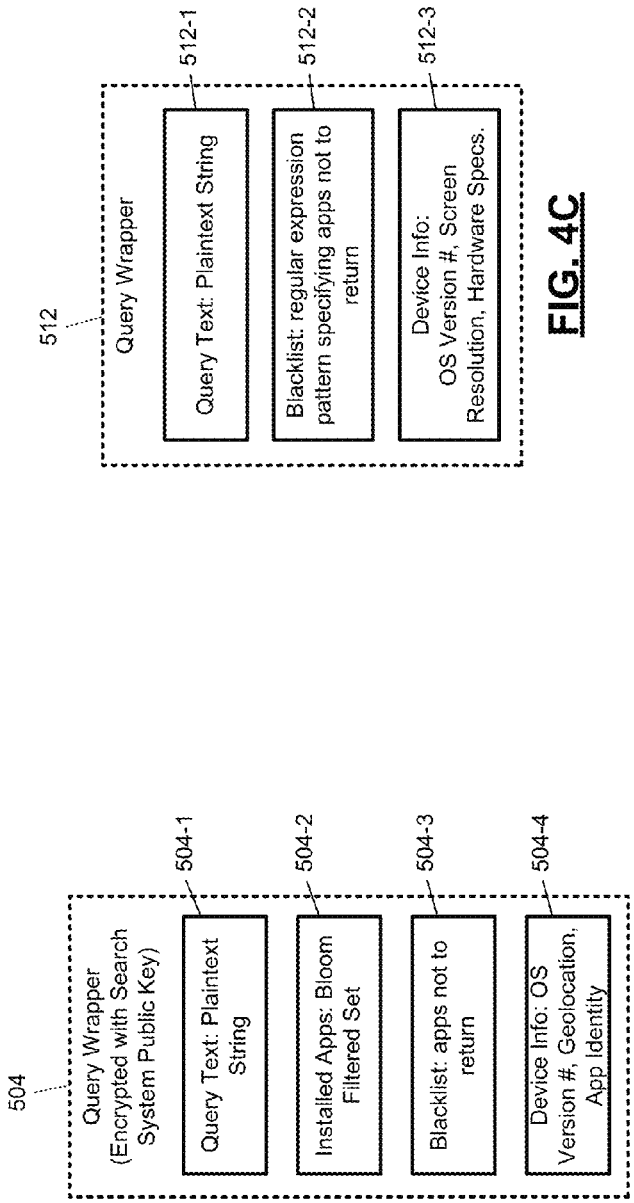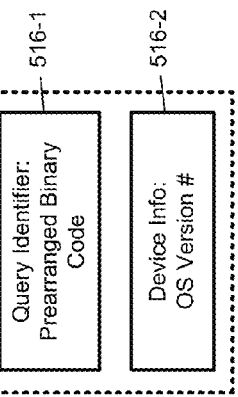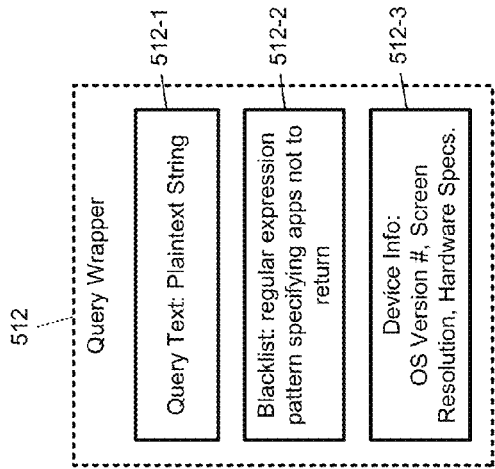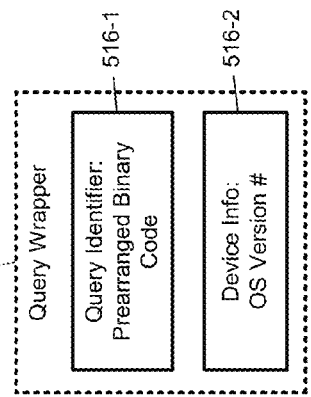

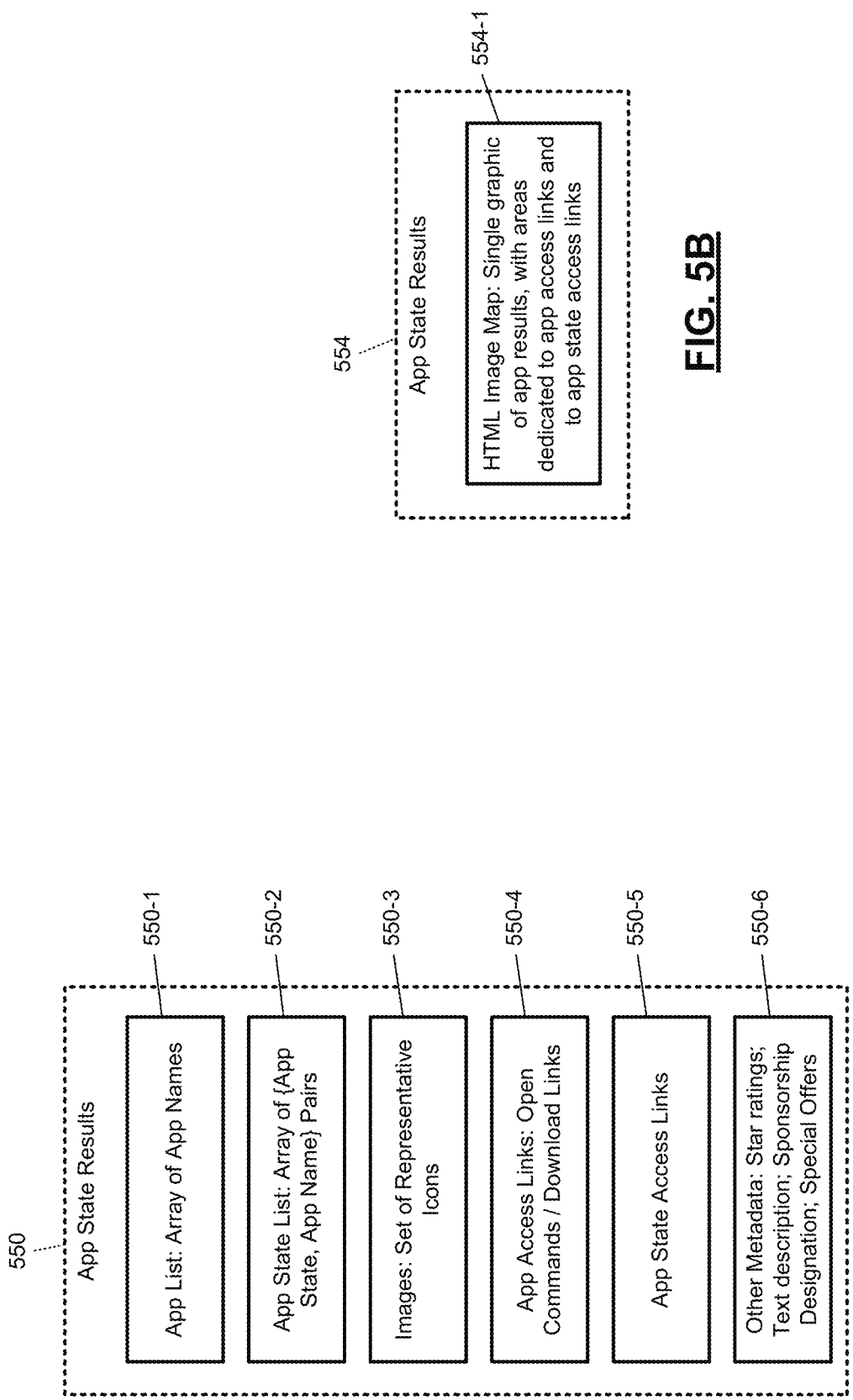

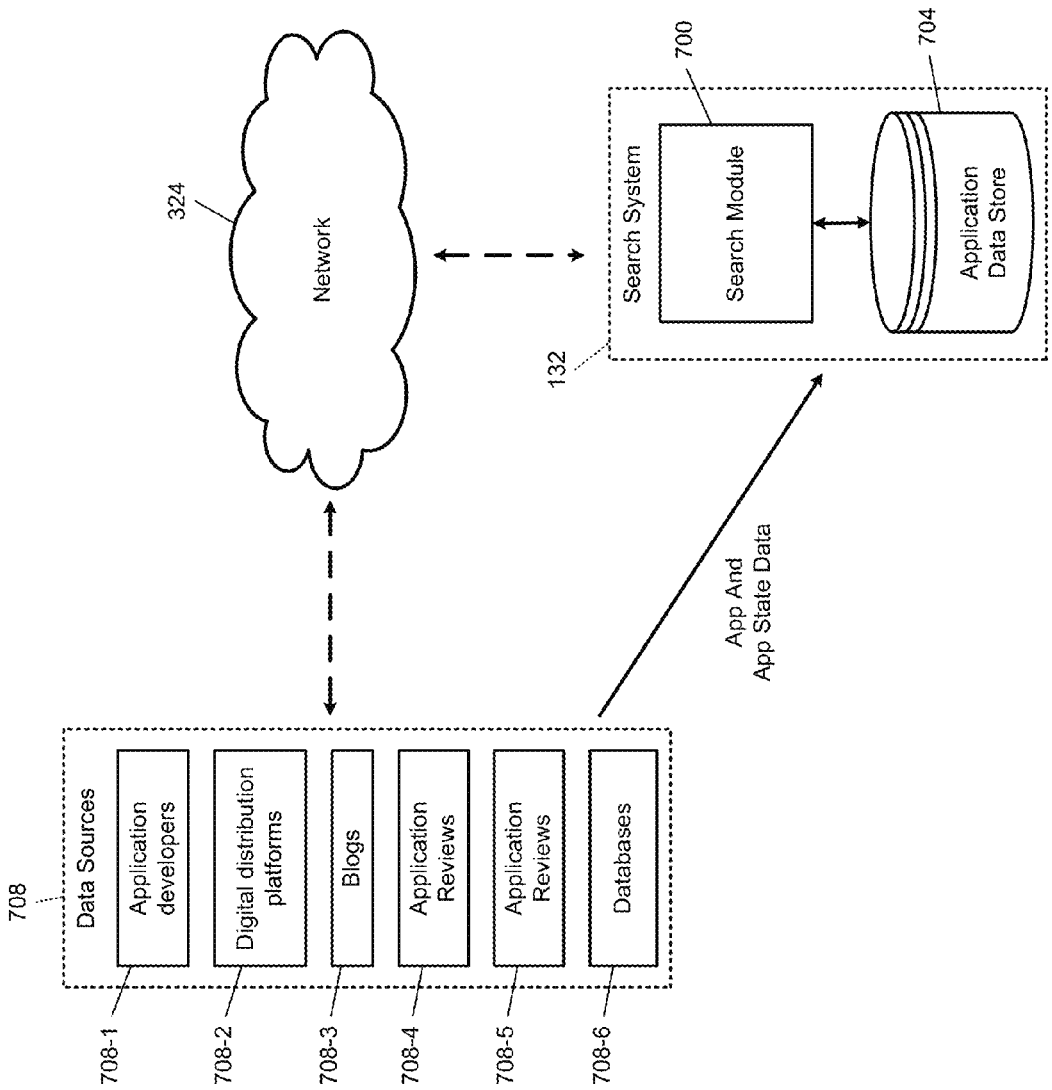

STATE-SPECIFIC EXTERNAL FUNCTIONALITY FOR SOFTWARE DEVELOPERS

CROSS-REFERENCE TO RELATED APPLICATIONS

This application claims the benefit of U.S. Provisional Application No. 62/054,237, filed on Sep. 23, 2014, the entire disclosure of which is incorporated herein by reference.

FIELD

The present disclosure generally relates to development systems and methods for providing external functionality to applications.

BACKGROUND

In recent years, the use of Internet-connected devices such as smartphones has grown exponentially. The number and variety of available software applications for such devices has similarly grown by orders of magnitude. Presently, many diverse functions can be performed and many diverse sets of data can be analyzed on any given Internet-connected device. The applications that offer this functionality and data span business-oriented applications, educational applications, games, new applications, shopping applications, messaging applications, media streaming applications, social media applications, etc.

With such a wide array of available applications, many users of Internet-connected devices are not aware of the availability of applications that may perform functions and/or provide data of interest to the users. Even app developers, who generally focus on one segment of the market for applications, are unable to keep up to date on all of the applications that their users might find valuable in other segments.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system of one or more computing devices includes a user interface presented to a first application developer. The system includes a data store configured to store information identifying a plurality of functions. Each of the plurality of functions corresponds to external functionality available from third party applications. The system includes an app functionality management module configured to receive a selection from the first application developer of a first function of the plurality of functions to supplement functionality of a first application under development by the first application developer. The system includes a code generation module configured to provide a first software object to the first developer for incorporation into at least a first state of the first application. The first state includes a first user interface element associated with a first entity. The first software object includes instructions for, in response to user selection of the first user interface element, preparing a query wrapper including a combination of (i) a predefined text string corresponding to the first function and (ii) a name of the first entity. The first software object includes instructions for transmitting the query wrapper to a search system. The first software object includes instructions for receiving a result set from the search system. The result set includes a plurality of items. A first item of the plurality of items includes (i) an identifier of a target application and (ii) an access mechanism for a specified state of the target application. The first software object includes instructions for displaying the plurality of items. The first software object includes instructions for, in response to user selection of the first item, actuating the access mechanism to open the target application to the specified state.

A method of operating one or more computing devices includes presenting a user interface to a first application developer. The method includes storing information identifying a plurality of functions. Each of the plurality of functions corresponds to external functionality available from third party applications. The method includes receiving a selection from the first application developer of a first function of the plurality of functions to supplement functionality of a first application under development by the first application developer. The method includes providing a first software object to the first developer for incorporation into at least a first state of the first application. The first state includes a first user interface element associated with a first entity. The first software object includes instructions for, in response to user selection of the first user interface element, preparing a query wrapper including a combination of (i) a predefined text string corresponding to the first function and (ii) a name of the first entity. The first software object includes instructions for transmitting the query wrapper to a search system. The first software object includes instructions for receiving a result set from the search system. The result set includes a plurality of items. A first item of the plurality of items includes (i) an identifier of a target application and (ii) an access mechanism for a specified state of the target application. The first software object includes instructions for displaying the plurality of items. The first software object includes instructions for, in response to user selection of the first item, actuating the access mechanism to open the target application to the specified state.

A non-transitory computer-readable medium stores instructions for execution on a processor of a computing device. The instructions include, in a first application, displaying a first state including a first user interface element associated with a first entity. The instructions include a first software object including instructions for, in response to user selection of the first user interface element, preparing a query wrapper including a combination of (i) a predefined text string corresponding to a first function and (ii) a name of the first entity. The first software object includes instructions for transmitting the query wrapper to a search system. The first software object includes instructions for receiving a result set from the search system. The result set includes a plurality of items. A first item of the plurality of items includes (i) an identifier of a target application and (ii) an access mechanism for a specified state of the target application. The first software object includes instructions for displaying the plurality of items. The first software object includes instructions for, in response to user selection of the first item, actuating the access mechanism to open the target application to the specified state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 4A-4D depict example contents of query wrappers sent to a search system.

FIGS. 5A-5B depict example contents of app results messages returned in response to a query wrapper.

FIG. 8 is a high-level block diagram of an example search system and representative data sources mined by the search system.

In the drawings, reference numbers may be reused to identify similar and/or identical elements.

DETAILED DESCRIPTION

Figure 1A:
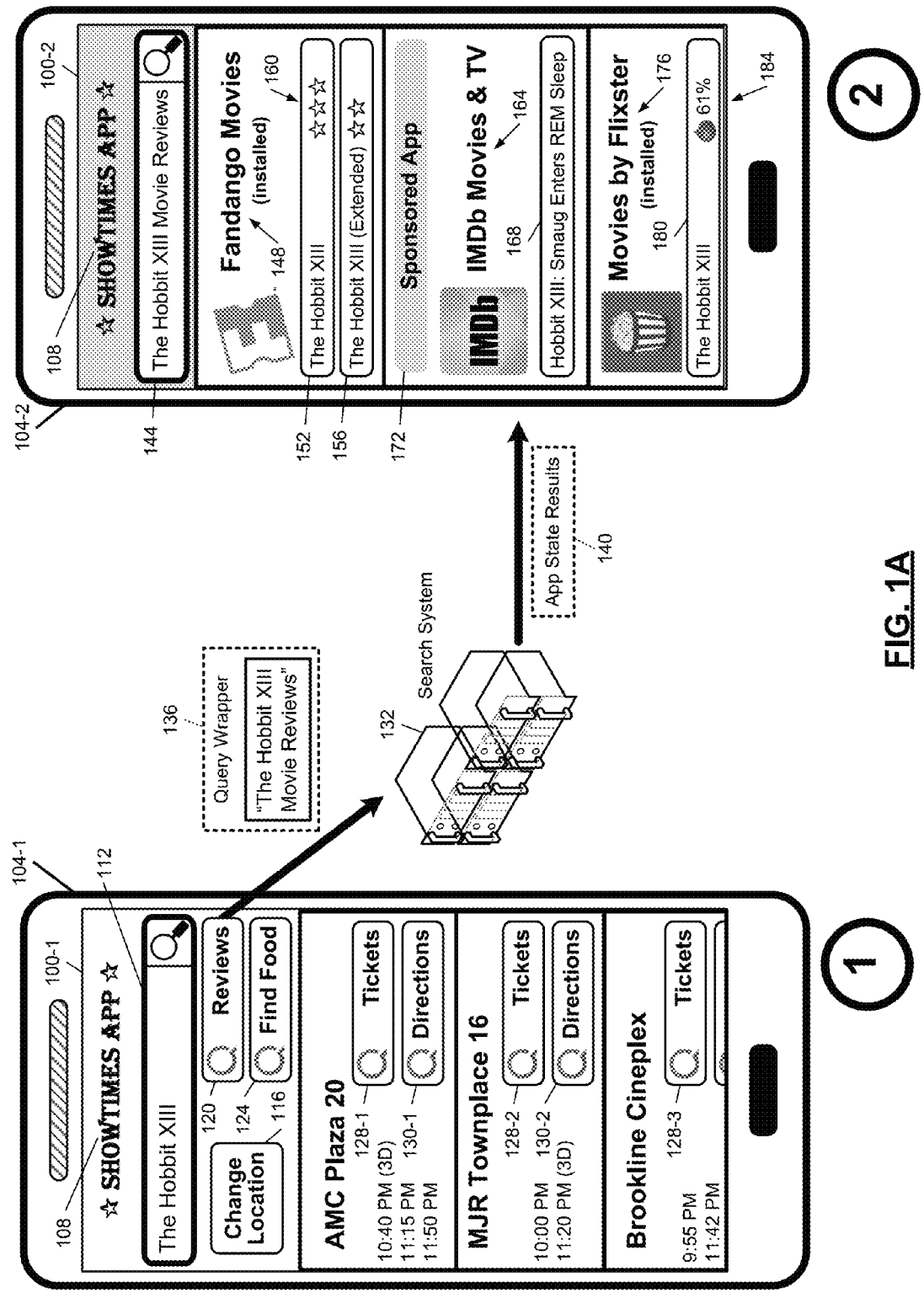
FIG. 1A is a combined functional block diagram and graphical user interface example according to the principles of the present disclosure.

A developer of an application (referred to interchangeably as an app) generally focuses on providing a good user experience for a limited number of functions. For example, an app developer may focus on providing accurate and intuitively-presented movie showtimes but may not invest effort in providing other related functionality, such as directions to movie theaters, dining options near the movie theaters, and/or reviews of the movies.

While an app developer generally would prefer that a user remain within their app, additional functionality, and therefore an improved user experience, may be provided by connecting to other apps. Connecting to other apps may provide a better user experience than attempting to replicate the functionality within the developer's own app. For example, if the developer is skilled at presenting movie showtimes and possesses valuable data and processing algorithms related to showtimes, the developer may not have expertise or unique content related to movie reviews. The developer can therefore rely on other apps whose focus is directed to movie reviews. For some functionality, such as GPS-based directions, a massive investment in mapping data and routing algorithms is required. As a result, few developers attempt to replicate mapping functionality within their app.

In order to access the functionality of another app, a developer may hard code a reference to that app when writing their code. In some circumstances, it is virtually guaranteed that an operating system will include a certain app. For example, a developer may reasonably expect that Google Maps will be available on an Android smartphone, although there are notable exceptions to this general rule, especially outside of the United States.

For most other categories of apps, such as movie review apps or restaurant review apps, there is no guarantee that any particular app will be present. Therefore, hard coding access to other specific apps is an exercise in guesswork. Also, the constant evolution of the app ecosystem means that the most popular, the most widely installed, and the most useful apps in any category may be different and may change with time.

For certain functions, a request may be passed to the operating system. For example, to map a location or to generate directions to a destination, a request can be passed to the operating system. The operating system may present the user with a list of installed apps to service that request. The operating system may allow the user to choose one of the apps as a default and, once a default is selected, the average user may never revisit that choice. Certain operating systems may not present a choice for certain requests, instead passing the request to a default app or service unless a specific configuration change is made by the user.

For all these reasons, the ability of an app developer to connect to other apps that would provide valuable functionality to the app developer's users is limited and difficult to implement. There is also no systematic way for developers to enter business relationships with each other. For example, an ad hoc arrangement may be possible where the developer of a movie reviews app compensates the developer of a movie showtimes app for each time that the movie reviews app is installed as a result of an advertisement or suggestion in the movie showtimes app.

The present disclosure presents a system where an app developer can quickly and easily add a wide variety of external functionality to an app. Instead of hard coding for specific apps, the present disclosure allows the developer to define a function of interest and, when a user expresses a desire to activate that function, a search system provides one or more apps that provide the desired functionality. These app results may include apps already installed and may also include apps not yet installed. For apps that are not yet installed, a mechanism may be provided for easy installation of the app.

For a streamlined user experience, the developer may link a user directly to a specific state within a specific app. For example, the developer of a movie showtimes app may include external functionality such as movie reviews. Instead of simply linking to the front page (or, default state or home state) of an app, the developer may link the user directly to the state within the selected app where reviews for the presently-displayed movie are shown.

In other words, when the developer's app is displaying showtimes for a first movie and the user of the developer's app selects a reviews button provided by the present disclosure, the results may include direct links to states of apps that show movie reviews for the first movie.

Further, a monetization system is integrated so that a third-party developer can promote their app and compensate the first app developer for activity driven by the first app developer. For example, compensation may be based on one or more of impressions (the number of times a user sees the sponsored app), cost per click (the number of times users click on the sponsored app being presented by the first app developer), and number of installs (when the sponsored app had not previously been installed and, as a result of the first app developer, the sponsored app is installed by the user). A portion of the revenue received from an advertising developer is retained by the monetization system and the remainder is distributed to the first app developer.

A developer may decide to promote their app even if they do not take advantage of the external functionality provided by the present disclosure. Not every advertiser (or, sponsor) will be a developer. Because state-specific links are provided, an advertiser may desire to promote their product or business (such as a restaurant) as a sponsored state within another app (such as a restaurant reviews app).

The advertiser may commit to paying a specified amount when their business or product is one of the specified states. The advertiser may pay to promote their business or product, such as by making a visual enhancement or moving the result further up in the results list. In addition, as described in more detail below, the advertiser may specify keywords or competitor establishments or products that will lead to the advertiser's states being displayed.

To allow the first app developer to harness the functionality of the rest of the app ecosystem with a minimal amount of extra coding, a developer portal is offered to developers. The developer portal offers pre-written code that a developer can incorporate into their app with little to no custom coding. The pre-written code may be offered as part of a software development kit, which may be implemented as a plugin for an integrated development environment, or as one or more libraries or packages. For convenience only, the provided code will be referred to below as a software development kit (SDK) library.

Included with the code or provided separately are user interface elements, such as logos, fonts, and graphics. The first app developer may add a button to one of the states (or, screens) of the app and display a logo from the developer portal on the face of the button. The action performed by the button (querying the search system and displaying results) is simply provided by a call to the SDK library. The software development kit may even automate creation and placement of a button or other user interface element and may automatically associate the button with corresponding code, such as a routine or function contained within the SDK library.

The developer portal may allow the first app developer to make choices relating to monetization, such as whether and how sponsored apps should be presented to a user, and how to be compensated for the display, access, or installation of sponsored apps. The first app developer may also be able to select apps or classes of apps not to present to the user. For example, the first app developer may not want to present a third-party app that is a competitor of the first app developer or that duplicates some of the functionality of the first app developer's own app.

The settings chosen by the developer may be stored local to the developer and integrated into the app itself or may be stored by the developer portal and shared with the search system. As mentioned above, when an end user of the developer's app clicks on a button enabled by the developer portal, a query will be sent to an search system, which returns app results, including names, icons, and other metadata related to the apps, and may include a ranking of the relevance of the returned apps.

The returned results can be displayed to the user by the SDK library. The results may be presented by themselves in a full screen or as only part of the screen real estate of the originating app. In some implementations, the developer is allowed to develop their own custom presentation layout for how the returned apps will be displayed. In other implementations, the display format may be fixed by the provider of the development portal. Although the provider of the development portal and the provider of the search system will be treated as a single entity below for ease of explanation, the developer portal and the search system may be operated by independent organizations.

In FIG. 1A, an unsophisticated Showtimes App 100 is shown running on a user device, such as smartphone 104. A first state of the Showtimes App 100 is shown at 100-1, and the corresponding reference numeral for the smartphone 104 is 104-1. The Showtimes App 100-1 includes branding (sometimes referred to as "chrome"), such as a title 108. In the simple interface of the Showtimes App 100-1, a search bar 112 identifies the movie for which showtimes are being displayed (a fictional "The Hobbit XIII") and allows the user to search for a different movie. The Showtimes App 100 may show theaters around the present location of the smartphone 104 but may allow for the user to change the specified location using a "Change Location" button 116.

The Showtimes App 100-1 lists a number of theaters at which the selected movie is playing and the corresponding showtimes at those theaters. Additional functionality not previously built into the Showtimes App 100 may include restaurants within the same vicinity as the movie theaters, directions to one of the movie theaters, reviews of the movie, purchase mechanisms for movie tickets, etc.

As described in more detail below, using the developer portal, the developer of the Showtimes App 100 can include buttons such as a "Reviews" button 120 and a "Find Food" button 124. In addition, a "Tickets" button 128-1 and a "Directions" button 130-1 may be associated with a first theatre ("AMC Plaza 20"). "Tickets" buttons 128 and "Directions" buttons 130 may be associated with each of the theatres.

The buttons 120 and 124 may be labeled with an icon or logo of the supplier of the previously-mentioned developer portal or the operator of a search system 132. For example, only a stylized "Q" may be displayed, which is associated with Quixey, Inc. of Mountain View, Calif.

When a user of the Showtimes App 100 selects (such as by tapping their finger) the "Reviews" button 120, a query wrapper 136 is sent to the search system 132. Example contents of the query wrapper 136 are described in more detail below, but may include a text query, such as "The Hobbit XIII Movie Reviews." Note that the query wrapper 136 includes not just the function (movie reviews) but also an indication of an entity ("The Hobbit XIII") that is the target of the function.

The search system 132, as described in more detail below, identifies relevant apps and app states based on the query wrapper 136. For example, relevant app states will likely include apps that have movie review functionality and that include a state with movie reviews of the identified entity ("The Hobbit XIII"). The search system 132 returns app state results 140 to the smartphone 104, and example contents of the app state results 140 are described in more detail below.

A graphical presentation of the app state results 140 are displayed in a state 100-2 of the Showtimes App 100, and the corresponding reference numeral for the smartphone 104 is 104-2. The Showtimes App 100-2 may also retain its own branding, such as the title, indicated at 108. The graphical results may be displayed in a portion of the Showtimes App 100, and the graphical results may appear to hover (not shown) over native content of the Showtimes App 100, such as by restricting the graphical results to a portion of the Showtimes App 100, leaving a border of native content of the Showtimes App 100.

In addition, the graphical results may be shown on a semi-transparent background so that the native content of the Showtimes App 100 (movie showtimes) remains at least faintly visible. In various implementations, the results may slide in from one side or from the top or bottom, suggesting to the user that the results can be dismissed by swiping in an opposite direction.

The search string that yielded the results may be presented to the user, such as at 144. This search string may be revised by the user to perform additional searches. In this way, the developer allows access through the Showtimes App 100 to an array of functions and states not explicitly anticipated by the developer.

Each graphical result may include a header (or, title), such as the header "Fandango Movies" at 148. The header may be the same as a title of an app, and may also indicate whether the app is installed. As shown in FIG. 1A with an "installed" parenthetical, "Fandango Movies" is already installed on the smartphone 104). Other text, such as "Open," may instead be used when the app is already installed. Apps not yet installed may be labelled with "Download" or "Install" labels. Equivalently, icons or other visual cues may distinguish between apps that can simply be opened (including native apps and, as described in more detail below, web apps) or first need to be installed.

Two specific states are displayed with respect to "Fandango Movies": "The Hobbit XIII" at 152 and "The Hobbit XIII (Extended)" at 156. This text may be the title text of the corresponding state in the "Fandango Movies" app. Additional data associated with each of these states may be shown. For example, the search system 132 may indicate that "The Hobbit XIII" state of the "Fandango Movies" app includes a 3-star rating. This 3-star rating may be shown at 160. Other data may include snippets of text (such as the first few words of a review), an image (such as a screenshot of the state), a reliability metric (such as number of user reviews), a freshness metric (such as most recent observed update to the state), etc.

These specific states may include user-selectable links directly to the corresponding entries in the "Fandango Movies" app. In other words, in response to user selection (such as by tapping the area of the screen associated with "The Hobbit XIII" 152), the SDK library in the Showtimes App 100 will open the "Fandango Movies" app to the state where movie reviews are shown for "The Hobbit XIII." As described in more detail below, this direct action may be accomplished by passing an identifier for the "The Hobbit XIII" state as a parameter to the "Fandango Movies" app or by executing a script that navigates to the "The Hobbit XIII" state from a default state of the "Fandango Movies" app.

If the user selects an area of the graphical results in the Showtimes App 100-2 that is associated with the "Fandango Movies" app, but not with one of the specific states 152 or 156, the SDK library may open the "Fandango Movies" app to a default state. In other implementations, selecting an area not associated with one of the specific states 152 or 156 will result in no action.

Another graphical result is presented for "IMDb Movies & TV" at 164, which may be the title of another app corresponding to specific states from the app state results 140. A user-selectable link 168 is shown for a state of the "IMDb Movies & TV" app titled "The Hobbit XIII: Smaug Enters REM Sleep."

The "IMDb Movies & TV" app is a sponsored app, which may be indicated as shown at 172 using a sponsorship banner. Sponsored apps can be highlighted in any way that is perceptible to the user, including increasing the font size, using different colors, adding a graphic or text sponsorship label, etc. In some implementations, the sponsorship may not be displayed to the user, and may simply cause the sponsored app to be moved up in the rankings.

The "IMDb Movies & TV" app is not shown with an "installed" parenthetical, indicating that download and installation must first be performed. Therefore selecting the user-selectable link 168 may trigger the opening of a digital distribution platform in either a web browser or a dedicated app, such as the Google Play Store app. The identity of the app to be downloaded is provided to the digital distribution platform so that the user is immediately presented with the ability to download the desired app. In some implementations, the download may begin immediately, and the user may be given the choice of approving installation.

Upon completion of installation, the SDK library may automatically navigate to the desired state of the "IMDb Movies & TV" app—that is, the "The Hobbit XIII: Smaug Enters REM Sleep" state.

A "Movies by Flixster" app title is shown at 176, and is associated with a user-selectable link 180 for a state titled "The Hobbit XIII." The user-selectable link 180 includes additional data associated with the "The Hobbit XIII" state. Specifically, a graphical and textual representation of critical reviews of the "The Hobbit XIII" movie are depicted at 184.

Figure 1B:
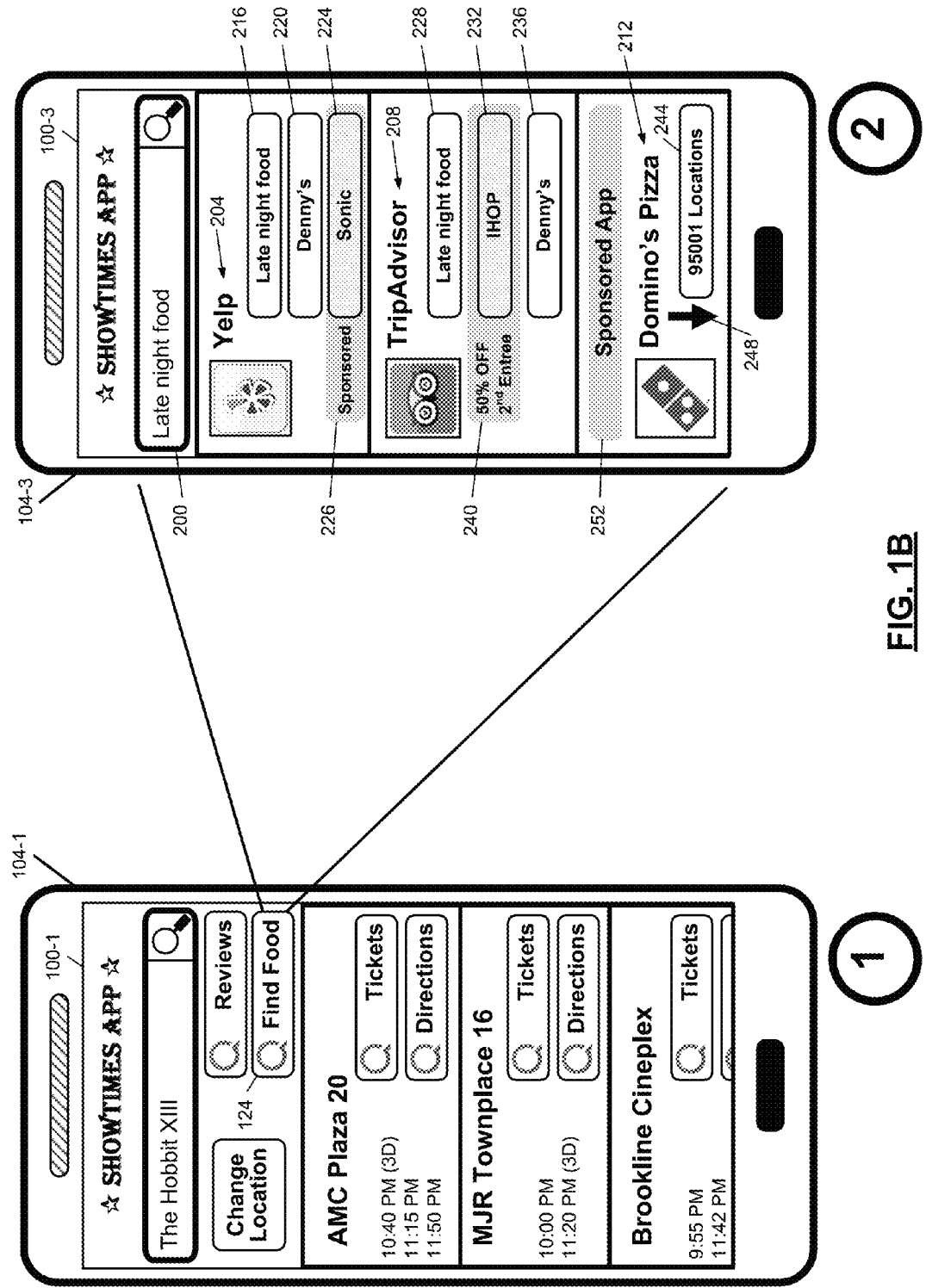
FIG. 1B is another example graphical user interface according to the principles of the present disclosure.

In FIG. 1B, when a user of the Showtimes App 100 selects (such as by tapping their finger) the "Find Food" button 124, a query wrapper (not shown) is sent to the search system 132. The search system 132 identifies relevant app states based on the query wrapper and transmits app state results to the smartphone 104.

For example, the "Find Food" button 124 may have initiated a search for "late night food" and supplied a geolocation of the smartphone 104. At state 100-3, the Showtimes App 100 displays a search box 200 showing the "Late night food" query and a list of relevant apps, including "Yelp" 204, "TripAdvisor" 208, and "Domino's Pizza" 212. The Showtimes App 100-3 may retain its own branding, such as the title, indicated at 108.

Note that "Late night food" may not be the preferred search in conjunction with afternoon matinee movies. The Showtimes App 100 may therefore implement multiple external functionality buttons, one that corresponds to a search for "Late night food", one that corresponds to "restaurants," and one that corresponds to "brunch restaurants." The Showtimes App 100 may select which one of these buttons is included in the state 100-1 based on a current time in the user's time zone, or based on the times of movie showtimes being displayed.

Underneath the "Yelp" title 204 are user-selectable links for "Late night food" 216, "Denny's" 220, and "Sonic" 224. The user-selectable link for "Late night food" 216 may open the "Yelp" app to a state presenting search results from a "Yelp" search for "Late night food." The user-selectable link for "Denny's" 220 may open the "Yelp" app to a state specific to a Denny's restaurant. In various implementations, the state may be for a general state of the "Yelp" app for the Denny's chain. Or, the user-selectable link for "Denny's" 220 may be specific to a single Denny's restaurant, such as the Denny's restaurant that is closest to the geolocation provided in the query wrapper.

In the example of FIG. 1B, the user-selectable link for "Sonic" 216 is a sponsored state, as indicated by a "Sponsored" label 226. The user-selectable link 216 may have been added to the search results due to the similarity of the "Sonic" state to the "Denny's" state. Or, the user-selectable link 216 may have already been present in the search results, but it has been emphasized in response to a bid from an advertiser.

Underneath "TripAdvisor" 208 are user-selectable links for "Late night food" 228, "IHOP" 232, and "Denny's" 236. The user-selectable link for "IHOP" 232 is sponsored, and is shown with an associated coupon label 240. An advertiser may have specified that the coupon label 240 should be applied to IHOP states of TripAdvisor. The advertiser may also have worked with a developer of TripAdvisor to present coupons for IHOP. As an example only, the coupon label 240 describes that a coupon would be available in the TripAdvisor app for a 50% discount on a second purchased entrée for IHOP.

Underneath "Domino's Pizza" 212 is a user-selectable link 244 for "94041 Locations." Based on a location, such as the location of the smartphone 104, the link 244 may be directed to a search within the Domino's Pizza app for restaurant locations within or near ZIP code 95001. In the example of FIG. 1B, the "Domino's Pizza" app is not installed on the smartphone 104, so the need for download and installation is indicated by a download graphic 248. The "Domino's Pizza" app 212 is a sponsored app, as indicated by a "Sponsored App" label 252.

Figure 1C:
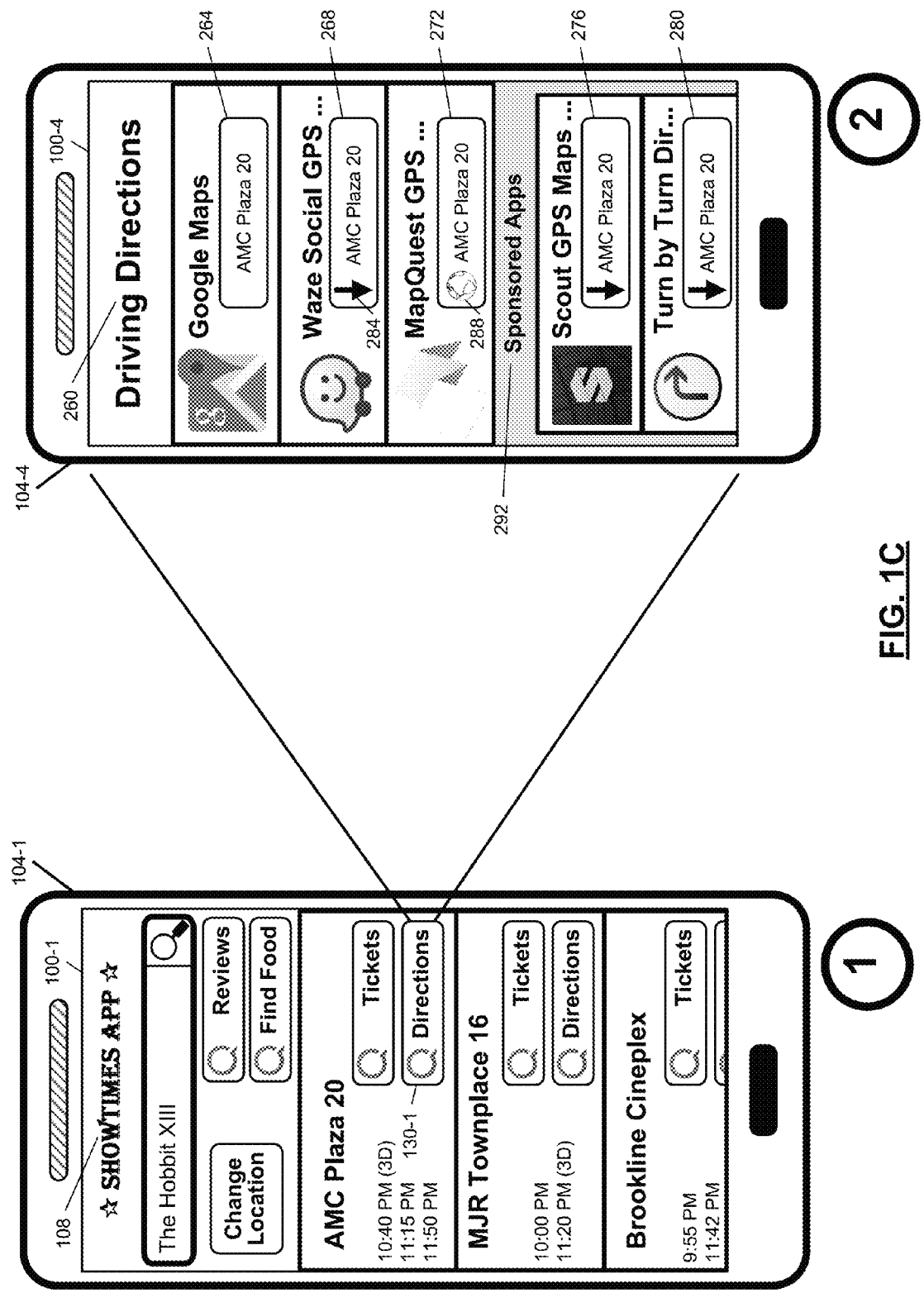
FIG. 1C is another example graphical user interface according to the principles of the present disclosure.

In FIG. 1C, when a user of the Showtimes App 100 selects (such as by tapping their finger) the "Directions" button 130-1, a query wrapper (not shown) is sent to the search system 132. The query wrapper may include text such as "Driving directions to AMC Plaza 20." The search system 132 identifies relevant app states based on the query wrapper and transmits app state results to the smartphone 104.

A graphical display of the app state results includes a user-selectable link 264 for an "AMC Plaza 20" state within "Google Maps," a user-selectable link 268 for an "AMC Plaza 20" state within "Waze Social GPS Maps & Traffic," a user-selectable link 272 for an "AMC Plaza 20" state within "Mapquest GPS Navigation & Maps," a user-selectable link 276 for an "AMC Plaza 20" state within "Scout GPS Maps, Meetup & Chat," and a user-selectable link 280 for an "AMC Plaza 20" state within "Turn by Turn Directions."

A title 260 indicates that the below app states are for "Driving Directions." In the example of FIG. 1C, the developer made the choice to display the app state results full screen, which may omit the developer's original branding, such as the stylized title 108. At 284, a download icon indicates that the "Waze Social GPS Maps & Traffic" app needs to be installed before use. In the example of FIG. 1C, the download icon 284 is contained within the border of the user-selectable link 268.

As described in more detail below, apps may also be accessed through intermediary software, such as a web browser. These apps, such as HTML5 apps, may be shown with an open action and may be identified as being a web-based app using an icon or text. For example, a globe icon is shown at 288 to indicate that the "Mapquest GPS Navigation & Maps" app will be opened in a web browser. As another example, a text label (not shown) could be included, such as "Open In Browser" or "Open On The Web."

Sponsored apps may be grouped together and labeled with a "Sponsored Apps" title 292. In various implementations, the sponsored apps may be shown at the top of the list, at the bottom of the list, in the middle or the list, or interspersed throughout the list.

Figure 2:
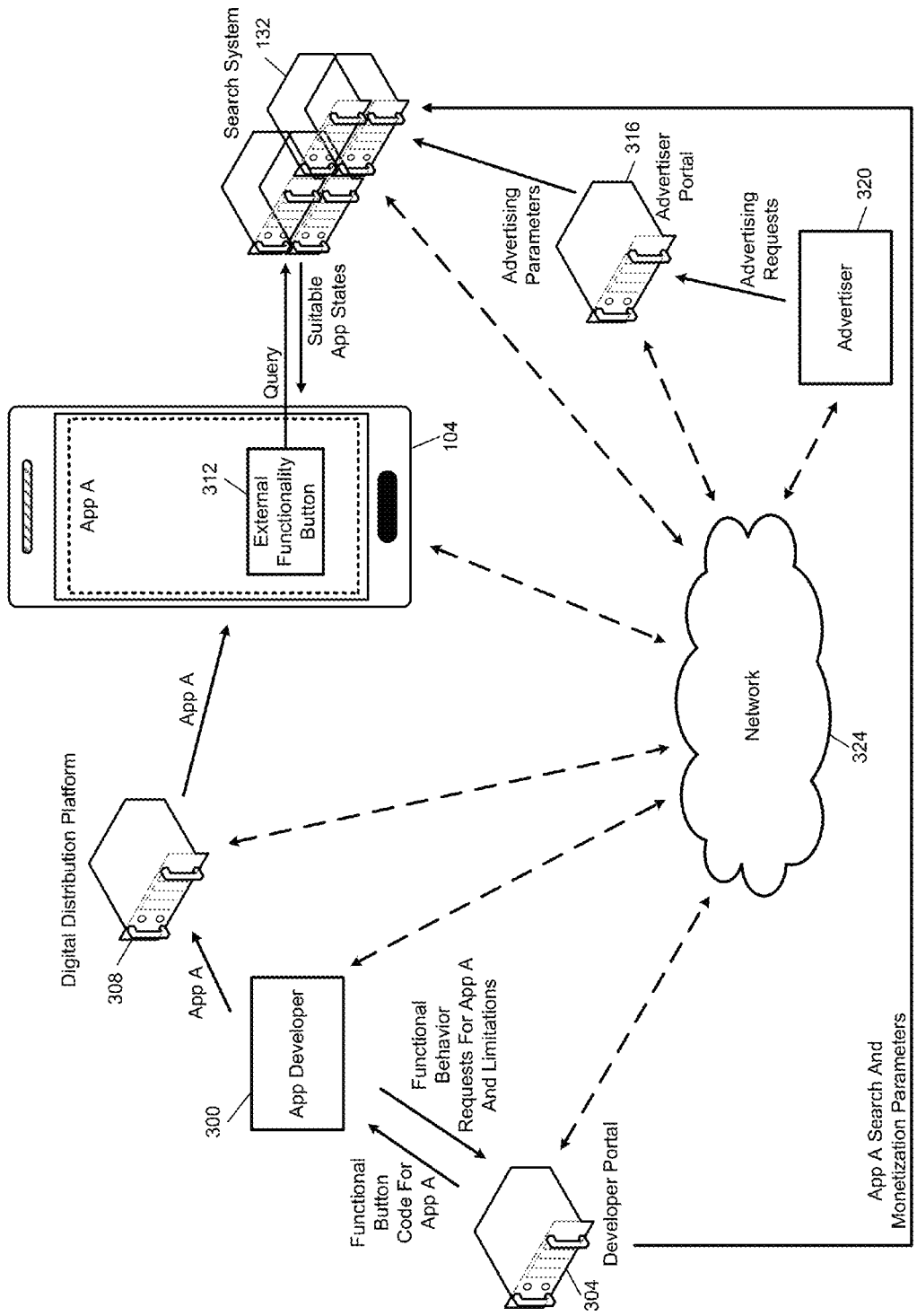
FIG. 2 is a high-level functional block diagram depicting how the principles of the present disclosure may be used in an application ecosystem.

In FIG. 2, a high-level overview of the overall system is shown. An app developer 300 interacts with a developer portal 304 when developing an app (referred to as App A). The app developer 300 identifies what external functionality is desired for App A and provides this information to the developer portal 304. The app developer 300 may also specify limitations, such as apps that the app developer 300 does not want to be shown to a user of App A.

The developer portal 304 provides code for App A that allows external functionality to be implemented into App A. A button associated with this external functionality will cause App A to query a search system 132. The developer portal 304 may provide parameters to the search system 132 based on the decisions made by the app developer 300. In some implementations, some or all of the decisions that the app developer 300 makes are incorporated into the code provided by the developer portal 304 to the app developer 300.

In other words, some data about App A may be known beforehand by the search system 132, while other data will be provided directly from App A, such as via the query wrapper. As one example, the app developer 300 may decide that App M should not be shown to users of App A and adds App M to a blacklist. The developer portal 304 may provide the blacklist to the search system 132 so that the search system 132 will return apps only if those apps are not in the blacklist. Alternatively, the code provided by the developer portal 304, and that is integrated into App A, may provide the blacklist to the search system 132 while App A is running. In other implementations, App A may not provide any information about a blacklist to the search system 132 and instead filter the results returned by the search system 132 to remove apps corresponding to the blacklist.

Once the app developer 300 receives the code from the developer portal 304, the app developer 300 finalizes App A (which may include compiling and linking) and provides App A to a digital distribution platform 308. One example of the digital distribution platform 308 is the Google Play® digital distribution platform by Google, Inc.

The developer portal 304 may provide code to the app developer 300 in a variety of forms. The code may be provided in plain text that can be copied and pasted into the coding platform used by the app developer 300. The developer portal 304 may instead provide some or all of the code in the form of a library (the SDK library), which may be precompiled object code.

The SDK library may be associated with an API (Application Programming Interface), and a definition of the API may be provided to the app developer 300. In some implementations, the app developer 300 may use a graphical user interface on the developer portal 304 (such as a website) to automatically generate appropriate API calls. These API calls can be included in App A during its development. The developer portal 304 may provide visual elements, such as buttons, for use by the app developer 300.

Choices made by the app developer 300 during development of App A may be fixed into the code received from the developer portal 304. Alternatively, the app developer 300 may be able to modify certain aspects of the code, such as by supplementing a blacklist. Once App A is provided to the digital distribution platform 308, the code in App A may be relatively fixed. Changes to App A may require a version update at the digital distribution platform 308. As a result, post-distribution changes, such as updating of blacklists, may instead be done using the developer portal 304 and communicated to the search system 132.

When a user of the smartphone 104 installs and opens App A from the digital distribution platform 308, an external functionality button 312 will be present on some or all of the states of App A. The term "state" may refer to a screen of App A. If App A is a movie showtimes app, each state may correspond to the showtimes of a particular movie in a particular location. The external functionality button 312 may be present in a template that applies across all of the states of App A that show movie showtimes.

App A may have additional states, such as a movie listing that lists all currently playing movies according to geographical area, a theater listing that lists all theaters within the geographical area, etc. The external functionality button 312 may be present in those states or may be absent. Depending on the choices made by the app developer 300, other external functionality buttons (not shown) may be present in those other states.

The app developer 300 may specify a template, or layout, for each type of state of App A. For example, the template may include two external functionality buttons, such as are shown in FIG. 1A ("Find Food" and "Directions"). A single template may include those two external functionality buttons, which are populated into any corresponding state of App A. For example, any state of App A that displays showtimes may be formatted using a single template. App A may include states, such as a form for providing feedback that a particular show time is wrong or that a movie theater is absent. These states may be created using a template that does not include the external functionality button 312.

When the user of the smartphone 104 actuates the external functionality button 312, such as by touching the external functionality button 312, a query wrapper is sent to the search system 132. The code provided by the developer portal 304 may receive a parameter corresponding to the present state of App A. This parameter allows the query wrapper to specify a desired specific state in any relevant apps. For example, the developer of a movie showtimes app may choose to pass the name of a movie, whose showtimes are presently being displayed, to be part of the query wrapper for a movie reviews function. For a directions function, the developer may choose to pass a name and/or address of a movie theatre to be part of the query wrapper. For a ticket-purchasing function, the developer may choose to pass a name of the movie theatre to be part of the query wrapper.

The search system 132 processes the query wrapper, as described in more detail below, and returns a set of suitable apps to the smartphone 104. The suitable apps may be displayed within App A using code provided by the developer portal 304. In other implementations, the smartphone 104 may include an app developed by an operator of the search system 132. This search system app may display the suitable apps to the user of the smartphone 104.

An advertiser portal 316 receives advertising requests from an advertiser 320. The advertiser portal 316 may provide app sponsorship opportunities to organizations that don't have accounts on the developer portal 304. In various implementations, the advertiser portal 316 may replace the sponsorship functionality of the developer portal 304 such that developers who want to promote their apps use the advertiser portal 316 instead of the developer portal 304.

The advertiser portal 316 also provides an ability for the advertiser 320 to promote a state of an app, where the state is associated with a product or service of interest to the advertiser 320. For example, the advertiser 320 may set keywords so that states for Denny's restaurants will be promoted in general. The advertiser 320 may also specify specific states, such as the Yelp state for Denny's, for promotion.

The advertiser 320 may also specify coupons that are available within an app. For example, an advertiser 320 may contract with Yelp (either directly or through an advertising network) to cause a coupon to be displayed within Yelp for Denny's restaurants. The advertiser 320 may then notify the advertiser portal 316 of the coupon so that result states in Yelp for Denny's can be shown with a coupon label. The existence of a coupon may be used as a factor by the search system 132 when scoring app states, with app states having coupons receiving a higher score.

Although FIG. 2 shows the effective flow of data between the components, in reality, the app developer 300, the developer portal 304, the digital distribution platform 308, the smartphone 104, the search system 132, the advertiser portal 316, and the advertiser 320 may communicate through the network 324. The network 324 may encompass local area networks, mobile phone provider's proprietary networks, and a distributed communications network, such as the Internet.

Figure 3A:
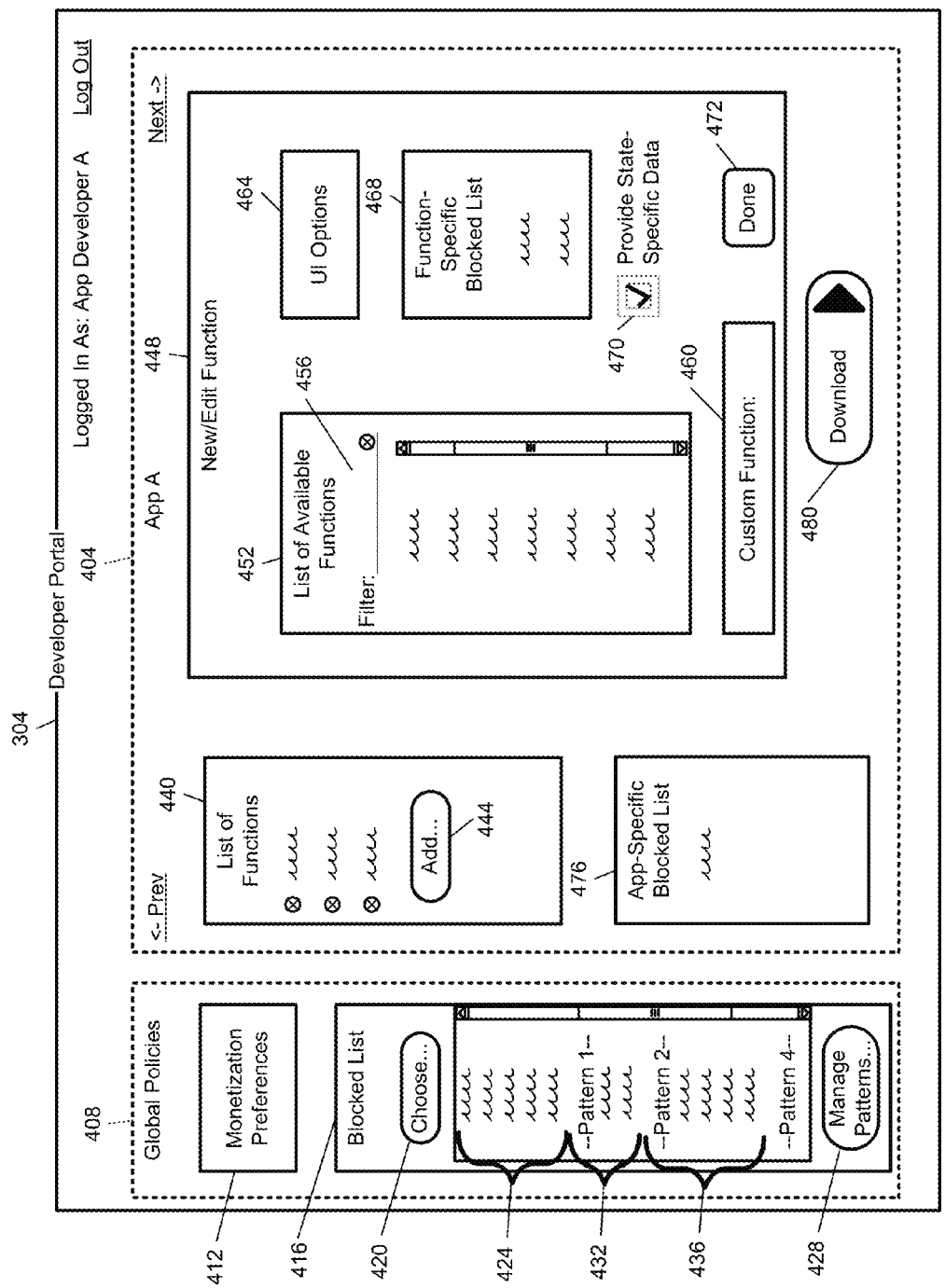
FIG. 3A is a simplified graphical user interface of an example developer portal.

In FIG. 3A, a simplified user interface for an example implementation of the developer portal 304 is shown. The app developer (referred to as App Developer A) logs into the developer portal 304, which may be a website. Because of the sensitivity of app and monetization information, a two-factor authentication protocol may be required for app developers.

App Developer A creates one or more app profiles in the developer portal 304. Settings and data related to App A are shown at 404, and the app developer 300 may be able to cycle through other apps using "Previous" and "Next" user interface elements 406-1 and 406-2. Global policies are shown at 408 and include monetization preferences 412 and a blocked list 416 that apply to all of the developer's apps.

The monetization preferences 412 may include payment details for App Developer A, including how App Developer A can provide money to the developer portal 304 to obtain advertising as well as how the developer portal 304 can pay App Developer A for sponsored links being shown in the apps associated with App Developer A. For example only, the monetization preferences 412 may include billing addresses and PayPal account information. In implementations where use of the developer portal 304 is not free, the monetization preferences 412 may also include options for beginning or ending service, and options for changing the payment schedule (for example, monthly or annually).

The blocked list 416 includes a list of apps and/or app states that App Developer A does not want to have displayed in any of the apps for App Developer A. A "Choose" button 420 allows App Developer A to choose, from a list, which apps should be blocked. This list (not shown) may be searched, filtered, etc. Explicitly chosen apps for a blacklist are shown at 424. In addition, a "Manage Patterns" button 428 may allow App Developer A to specify wildcard patterns that match apps not to be presented to users of App Developer A's apps. For example, if App Developer A works for Sam's Club Warehouse Centers, one specified pattern may be for Costco. The Costco pattern may include wildcards before and after "Costco" so that any Costco app is identified.

Although this discussion focuses on the titles of apps, blacklists may also be specified based on words in the description of an app, the name of the developer of the app, etc. In addition, general blacklist criteria may specify that, for example, an app downloaded less than a specified number of times should not be shown to a user. The manage patterns button 428 may allow App Developer A to specify patterns using wildcards, regular expressions, etc. A first specified pattern followed by two apps that match that pattern are shown at 432. Similarly, a second pattern and four matching apps are shown at 436.

In various other implementations, App Developer A may specify a whitelist of apps to display, where any apps not included in the whitelist will not be presented to a user of App A. In other implementations, App Developer A may specify a preference list including apps that are preferred: these apps are then emphasized (such as by moving higher on the screen) when present in the result set. The preference list may be an ordered structure, such that an app appearing higher in the preference list is to be given greater precedence than an app appearing lower in the preference list.

In the app specific settings 404, a list of functions 440 identifies what external functionality will be available to App A. For example, the listed functions within 440 may correspond to finding food, finding driving directions, and finding movie reviews. An "Add" button 444 allows a new/edit function to be identified using a new function interface 448. A list of available functions 452 may include functions of interest identified by the developer portal 304 for various verticals, such as movies, dining, travel, sports, etc. A filter interface 456 allows the available functions to be filtered for easier identification of the desired function. If none of the available predefined functions appear to address App Developer A's needs, a custom function may be specified at 460. For example, a text string may be typed into a text box.

A user interface options portion 464 allows App Developer A to specify how results for the selected function should be displayed. The options may include specifying how many results are to be shown, what associated information (such as starred ratings) should be shown, how the button corresponding to the function should be displayed, and how sponsored apps will be identified. As one example, App Developer A may specify how many sponsored apps should be shown in a results set. In another example, App Developer A may be able to specify that only already-installed apps should be shown to the user. App Developer A may also specify, such as by using CSS (Cascading Style Sheets), the graphical presentation of search results.

For example, in the user interface options portion 464, the App Developer A may specify a particular shape and size for a button, and may identify whether logos or texts identifying the developer portal 304 (such as a logo of a provider of the developer portal 304) should be shown on the button. App Developer A may be able to specify in the user interface options portion 464 that App Developer A will create the button or other user interface element and that therefore the user interface element does not need to be provided by the developer portal 304. Instead, the developer portal 304 can provide the code for searching for the function, which will be called by whatever user interface element App Developer A creates.

A function-specific blocked list 468 allows App Developer A to block apps and/or states specifically per function. For example, App Developer A may believe that a particular popular app does not provide a good user experience for the particular function at issue. This app can therefore be added to the function-specific blocked list 468.

A checkbox 470 indicates an intent of App Developer A to supply state-specific data. For example, when a function such as movie reviews is chosen, App Developer A may check the checkbox 470 to indicate that a name of a movie will be appended to a text query for "Movie Reviews." The developer portal 304 may provide App Developer A with an API call that concatenates "Movie Reviews for" with a string supplied by App Developer A. App Developer A may programmatically pass the name of the movie for which showtimes are currently being displayed to the API. In other words, when viewing showtimes for a movie titled "The Dark Knight Rises," actuation of a movie reviews user interface element by the user will cause the showtimes app to pass the title "The Dark Knight Rises" along with the movie reviews function to create a concatenated "Movie Reviews for The Dark Knight Rises" query.

When a function has been specified and/or edited, a "Done" button 472 can be actuated by App Developer A. An app-specific blocked list 476 allows App Developer A to block apps and/or states for all functions specified for App A. For example, App Developer A may develop apps for a number of small companies. Each app may therefore correspond to a different company. Each company may have their own list of competitors that may be added to the app-specific blocked list 476.

A "Download" button 480 allows App Developer A to obtain the code necessary to access the specified functions in the list of functions 440. As discussed above, a customized SDK library may be downloaded in response to the "Download" button 480. Alternatively, a predetermined SDK library may be downloaded that forms query wrappers and presents search results. The SDK library may be accessed using an API; API calls corresponding to the list of functions 440 may be downloaded for use in the programming environment of App Developer A.

A software development kit (SDK) may be downloaded using the "Download" button 480. The SDK may integrate with the programming environment of App Developer A, such as an integrated development environment. The SDK may duplicate or replace some of the features of the developer portal 304, in one example resulting in FIG. 3B. The SDK may provide for one-click addition of a specified function to a template or layout that App Developer A is creating. With that single click, the SDK may place a user interface element, such as a button, into a graphical form editor. The SDK may also create an appropriate API call to the SDK library that can send a query wrapper and receive app results. The SDK may also populate an entire new screen (state) of the application with graphical elements used for displaying app results. In other implementations, the SDK may insert API calls that will allow App Developer A to query the results returned and format and display the results in whatever manner App Developer A chooses.

The settings specified in the developer portal 304 may be reflected in the parameters of the API calls, the downloaded code, a custom SDK library, etc., provided by the developer portal 304. This code may then be integrated into App A and the code integrated into App A is solely responsible for providing relevant information to the search system 132. Alternatively, some data may be communicated by the developer portal 304 to the search system 132. For example, the global policies 408 may be provided to the search system 132. Then, whenever an app corresponding to App Developer A queries the search system 132, the search system 132 is aware of, and operates according to, the global policies 408 set by App Developer A.

App-specific policies may also be communicated to the search system 132. That way, when the search system 132 receives a query from App A, the search system 132 is aware of some or all of the parameters specified in the developer portal 304 for App A. App Developer A may make changes in the developer portal 304 subsequent to distributing App A. These changes may be sent to the search system 132 to allow for the behavior of external functionality buttons to be adapted over time without having to create a new version of App A digital distribution platform 308.

As mentioned above, some parameters may never be communicated to the search system 132 in some implementations. For example, certain blocked apps may be filtered out within App A itself as opposed to being filtered out by the search system 132. This filtering may be performed by code provided by the developer portal 304 and customized by, for example, the blocked list 416. Alternatively, the developer portal 304 may provide instructions to App Developer A on how to perform the filtering using appropriate API calls to functions or libraries provided by the developer portal 304.

Figure 3B:
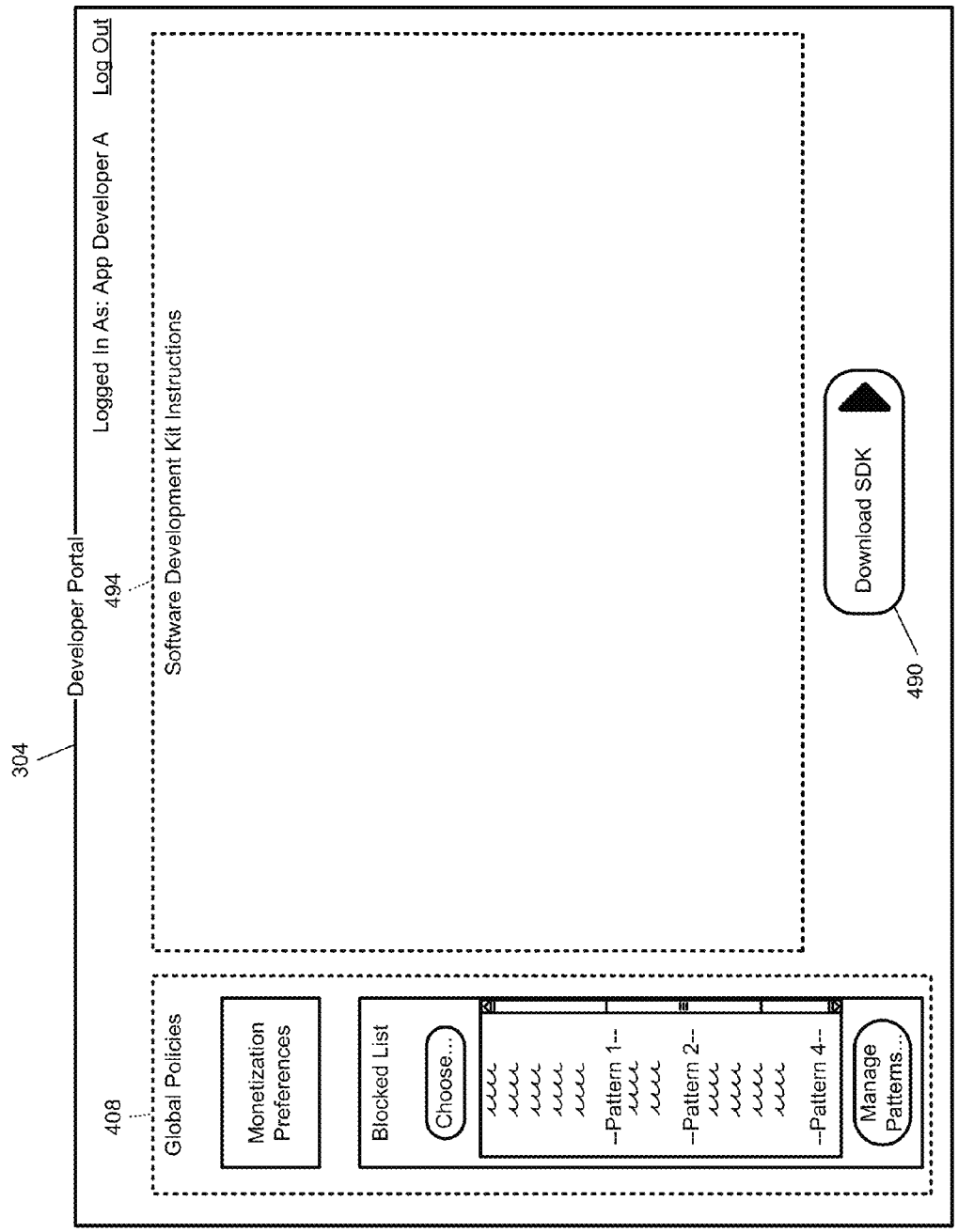
FIG. 3B is a simplified graphical user interface for another example developer portal.

In FIG. 3B, one example of an implementation of the developer portal 304 for use with a software development kit is shown. Global policies 408 may still be specified using the developer portal 304 of FIG. 3B. However, app-specific or function-specific parameters may be configured using the software development kit, which is downloaded at 490. Instructions for using the software development kit may be displayed at 494. Additional instructions and/or wizards, walkthroughs, and tutorials may be contained within the software development kit. The global policies 408 may be communicated to the search system 132, while app-specific parameters are encoded into whatever app App Developer A creates using the downloaded software development kit.

FIGS. 4A-4D show example contents of a query wrapper. In FIG. 4A, a query wrapper 504 is encrypted with a public key of the search system 132. This public key may be provided to the App Developer using the developer portal 304 as part of the code that generates the query wrapper 504. By encrypting the query wrapper with the search system's public key, only the search system, which is in possession of the corresponding private key, can decrypt the query wrapper 504. This prevents any man-in-the-middle eavesdropping of queries performed by the user. At 504-1, the query text may be specified as a plaintext string, such as "Late night food" or "The Hobbit XIII Movie Reviews."

At 504-2, a representation of installed apps is provided. For example, an exhaustive listing of all installed apps including titles and version numbers may be included. In some implementations, a bit field may be specified for the one-hundred most popular apps. In other words, one hundred binary digits correspond to whether each of those apps is installed, with a zero indicating that the app is not installed and then one indicating that the app is installed. Although one hundred is used as an example, for efficient storage a power of two (such as 128) may be used. To allow for this shortened bit field format, the set of apps must be pre-arranged.

Another mechanism for indicating installed apps using a limited number of bits is a Bloom filter. The Bloom filter specifies whether an app from a predefined set of apps is possibly installed on the device or whether the app is definitely not installed. To achieve storage compression, the output of a Bloom filter does not definitively state that a certain app is present; the Bloom filter output only definitively states whether certain apps are not present.

At 504-3, a blacklist is specified. This blacklist may supplement a blacklist already present in the search system 132 or may be a stand-alone blacklist. The blacklist may list apps not to return based on unique identifiers of those apps, which are known beforehand by the search system 132.

At 504-4, device info of the device transmitting the query wrapper 504 may be included. This information may include the operating system and the operating system version number, geolocation data for the device, an identity of the app sending the query wrapper 504, an identity of the app developer of the app, screen resolution, and portrait/landscape orientation. For example, the app or app developer identities may be used by the search system 132 to apply pre-arranged parameters provided by the developer portal 304, such as a blacklist. The app identity may also be used by the search system 132 to remove that app and related states from the results—in other words, to avoid returning a result that points back to the very same app that sent the query wrapper 504.

In FIG. 4B, an example query wrapper 508 may simply include query text 508-1. In this case, the search system 132 may have no indication of which app is sending the query and will simply respond with suitable apps based only on the query text.

In FIG. 4C, an example query wrapper 512 includes a plaintext string specifying the query text 512-1. A blacklist 512-2 may specify apps not to return by including one or more regular expression patterns. The regular expression patterns may be stored as strings. Device info 512-3 may include the operating system version number as well as details about the device, including screen resolution, screen orientation (portrait or landscape), details about the hardware of the device (processing power, availability of GPS), etc.

In FIG. 4D, a query wrapper 516 may specify a query identifier 516-1, which is a pre-arranged binary code. For example only, the developer portal 304 may store a mapping from the function "find food" to a pre-arranged binary code. This pre-arranged binary code is specified by the search system 132 or provided by the search system 132 so that when the pre-arranged binary code is received by the search system 132, the search system 132 recognizes that a "find food" query should be performed.

In this way, the text of the query may change over time, so that a "find food" query may later be changed by the developer portal 304 or the search system 132 to be a "find restaurants" query. These updates may be made by operators of the search system 132 and/or the developer portal 304 based on user experiences. For example, a search for "find food" may identify grocery stores, which will be less valuable for users trying to find a restaurant prior to a movie. The query wrapper 516 may also include device info 516-2, such as an operating system version number.

FIGS. 5A-5B depict example formats for app state results. The app state results may be provided as a file over any suitable protocol, such as HTTP (hypertext transfer protocol) or FTP (file transfer protocol), or as an object sent over a higher level protocol such SOAP (simple object access protocol). The app state results may be physically transported across a network using multiple packets, frames, etc.

In FIG. 5A, an app state results structure 550 includes an app list 550-1. For example, the app list 550-1 may include an array of strings, each string storing an app name. The order of the array may be from most relevant to least relevant, which may be further adjusted based on sponsorship. The number of apps provided in the app list 550-1 may be chosen according to a resolution of the device sending the query wrapper. For example, a device with a larger screen and/or higher resolution may receive a larger number of apps. In addition, the number of apps provided may be specified by the app developer using the developer portal 304 or the software development kit.

An app state list 550-2 includes an array of pairs, where a first value of each pair corresponds to an app state (which may be a title, such as "The French Laundry") and the second value of each pair corresponds to the associated app (such as "Yelp").

An images field 550-3 may include encoded images, such as icons, for each of the apps in the app list 550-1. In other implementations, the images field 550-3 may include encoded images, such as screenshots, for each of the app states in the app state list 550-2.

An app access links field 550-4 specifies access mechanisms for a default state of each of the apps in the app list 550-1. For example, the access links may include commands to open the app if installed and/or links to a digital distribution platform to download an app that is not installed. Another access mechanism may be a URL (uniform resource locator) to access a web-based app through a browser. When the app state results structure 550 is returned, code within the app may determine whether open versus download is the appropriate action based on the specific installation status of each app.

An app state access links field 550-5 specifies access mechanisms for each of the app states in the app state list 550-2.

Additional metadata 550-6 may include a rating for each app (such as a number of stars), a text description for each app, review text and metrics (such as number of reviews), and a designation of sponsorship. The sponsorship designation may be a simple binary flag or may include an indication of sponsorship level. For example, a sponsor may be willing to pay a greater amount for a new install than for an existing app. This level of interest by the sponsor may allow the app to promote the sponsored app more prominently in hopes of recognizing that revenue.

The additional metadata 550-6 may include download velocity (the number of downloads over a recent time horizon) or other indicators of trending popularity of an app. A new and valuable app may not yet have a large installed base, but may show rapid growth in number of downloads. Therefore, trending popularity may be used as a signal to rank the display of apps, with trending apps moved higher up in a results list. Further, a visual indication of trending, such as text ("trending" or a word correlated with trending, such as "popular") or an icon, may be shown in close proximity to an app for which a trending metric of the app is above a threshold. The threshold may be an absolute threshold for all apps, or may be relative/normalized to the market segment in which the app exists or to the other apps in the results list.

In FIG. 5B, app state results 554 may include an HTML (hypertext markup language) image map 554-1. The HTML image map 554-1 may be a single image, such as a JPEG (joint photographic experts group) or PNG (portable network graphics) image, divided into separate areas. Each area corresponds to an app or app state and shows text and/or icons corresponding to that app or app state. When the HTML image map is actuated, the corresponding section of the image map activates a corresponding access mechanism for the app or state displayed in that region of the HTML image map 554-1.

The HTML image map 554-1 may be sized according to the size of the requesting device by the search system 132. In other implementations, multiple HTML image maps may be provided and an appropriate one may be selected at the device according to the resolution of the device's screen and the amount of real estate to be dedicated to the results display. The search system 132 may create an HTML image map that will work with a certain range of display sizes and resolutions, and if the specified region for display is within that certain range, the HTML image map may be proportionally scaled by the device.

Figure 6:
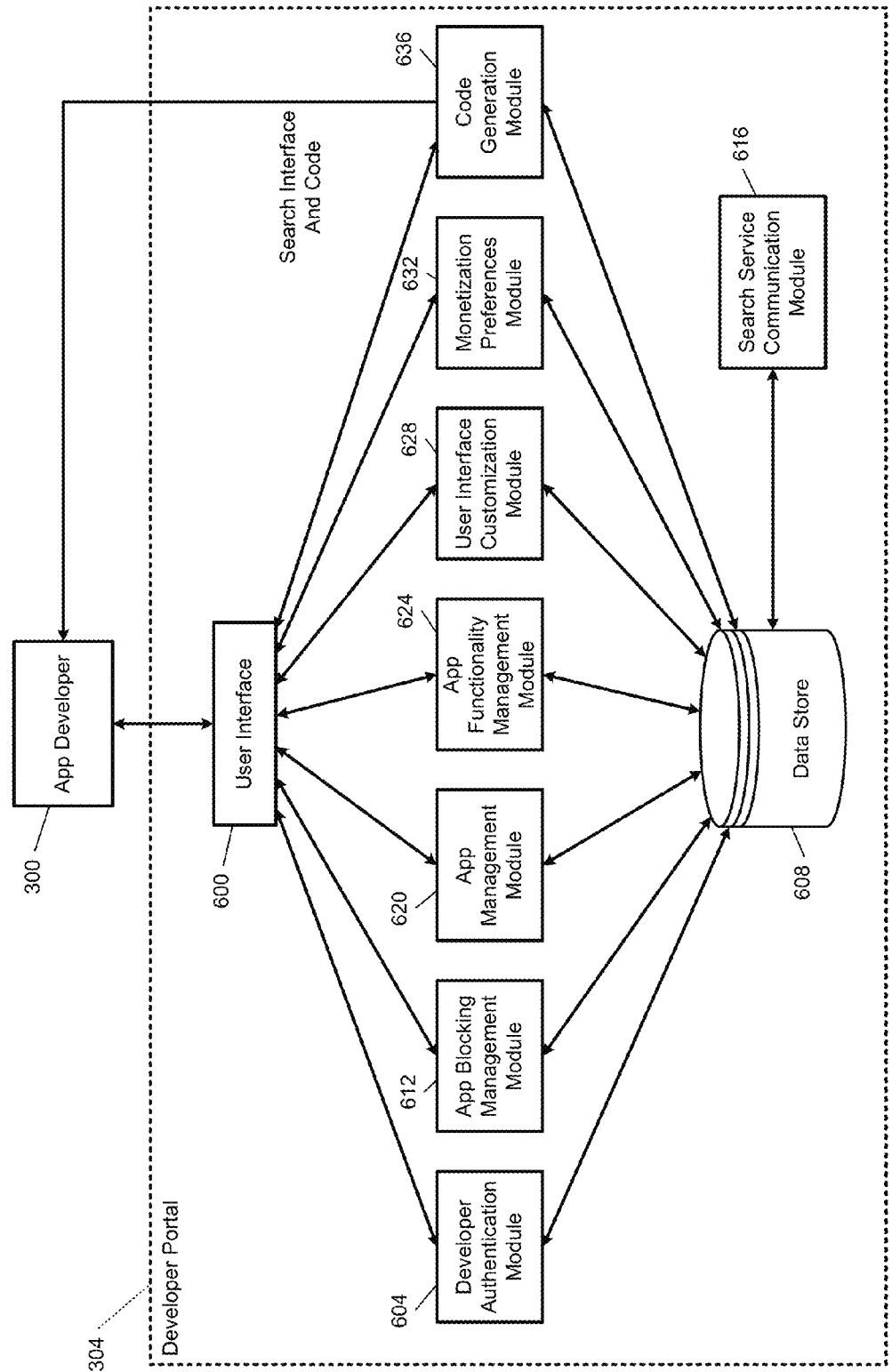
FIG. 6 is a high-level functional block diagram of an example developer portal.

In FIG. 6, a high-level functional block diagram of an example implementation of the developer portal 304 is shown. The developer portal 304 includes a user interface 600, which may be implemented as a website, for access by the app developer 300. A developer authentication module 604 stores credentials for various developers and securely authenticates each developer to the developer portal 304. The developer authentication module 604 may store credentials of app developers in a data store 608. Credentials are stored according to best practices, such as by adding a cryptographic salt value and using PBKDF2 (Password-Based Key Derivation Function 2).

An app blocking management module 612 allows for the formulation of patterns that match against apps desired to be blocked by the app developer 300. The patterns and explicitly selected apps to block are stored in the data store 608, and may have associated metadata indicating whether those apps are blocked for all apps of the developer, for a specific app of the developer, or for a specific function of one or more apps. The entire list of apps available to be blocked may also be stored in the data store 608, and may be obtained from the search system 132.

A search service communication module 616 may periodically update the data store 608 based on the list of apps recognized by the search system 132. User-specific data may be encrypted while stored in the data store 608. In various implementations, general data, such as the list of apps, may be stored in unencrypted form.

An app management module 620 tracks various apps that each developer is working on, including names and other parameters of each app. An app functionality management module 624 tracks what external functionality is being used for each app. The app functionality management module 624 stores a list of the functions used in each app in the data store 608. The app management module 620 stores a list of apps developed by the app developer in the data store 608.

A user interface customization module 628 stores data controlling how each function or app will appear as specified by the developer. This may include graphical properties of a button, such as whether a shadow is present, whether a 3D effect is used, font, etc. In addition, preferences for labelling and presentation of sponsored apps may be set using the monetization preferences module 632 and stored in the data store 608.

A monetization preferences module 632 stores monetization preferences for each app developer. In various implementations, monetization preferences may be different for each app of the app developer. An app developer, or an advertiser working on behalf of an app developer, may use the monetization preferences module to book promotion of their app, even if their app does not take advantage of the external functionality features offered by the developer portal 304.

In other words, such developers can pay (according to, for example, cost per impression, cost per click, or cost per install) to have their app promoted by app developers who have implemented external functionality using the code offered by the developer portal 304. For this reason, the developer portal 304 may also be referred to as an advertiser portal. In various implementations, the developer portal 304 may charge a developer a fee (which may be assessed per app or per query sent to the search system 132) to use the code and services from the developer portal 304.

A code generation module 636 generates code to be provided to the app developer 300. This code may include a custom SDK library based on data from the app blocking management module 612, the app management module 620, the app functionality management module 624, the user interface customization module 628, and the monetization preferences module 632. The code generation module 636 may generate specific API calls to implement the preferences of the app developer. The code generation module 636 may also provide a software development kit to the app developer 300.

As preferences change in the data store 608, the search service communication module 616 may update the search system 132 with the updated preferences. In this way, the app developer may be able to alter which apps are blocked, which sponsored apps are shown, etc. for an app that has already been distributed.

Figure 7:
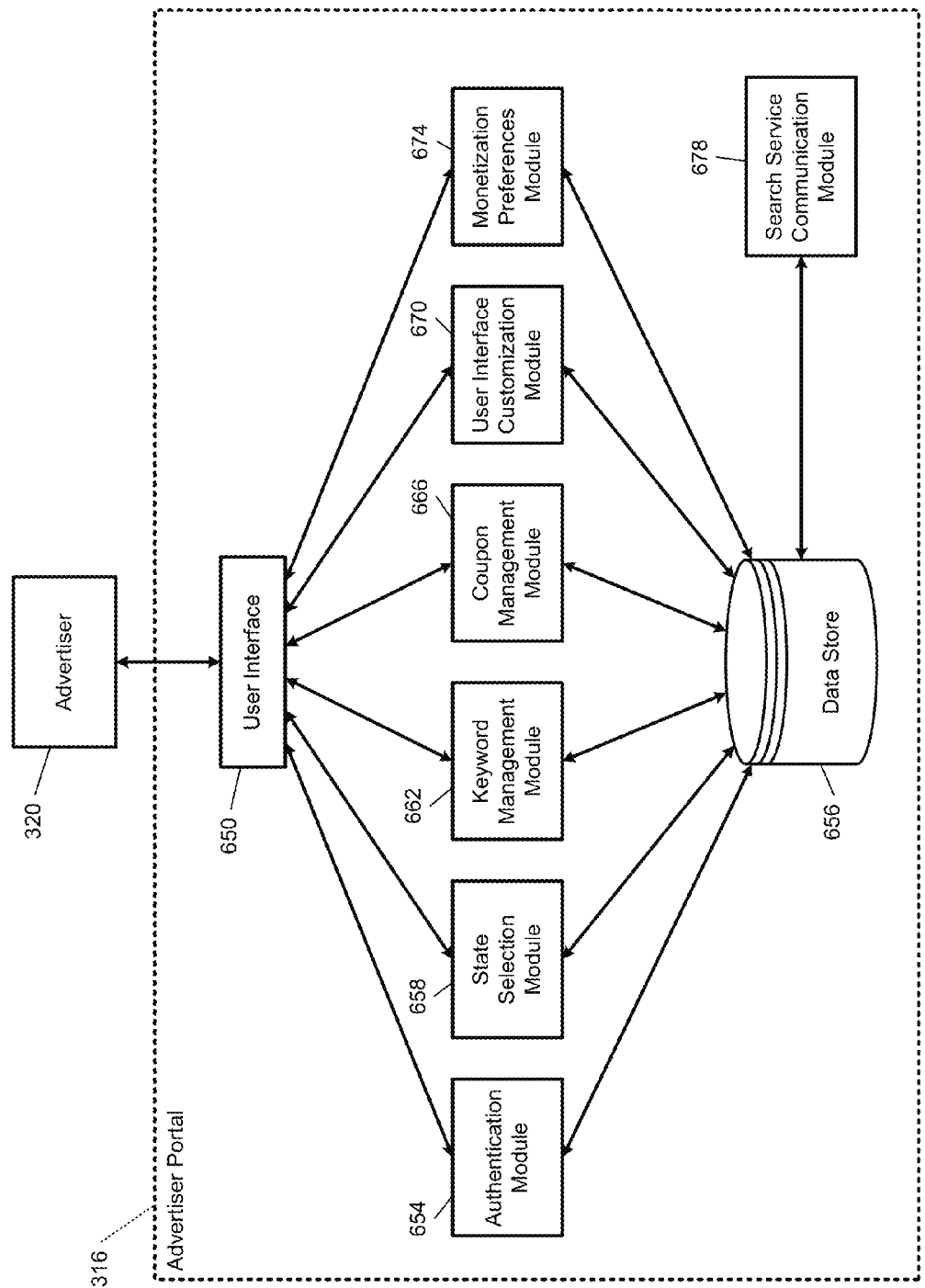
FIG. 7 is a high-level functional block diagram of an example advertiser portal.

In FIG. 7, a high-level functional block diagram of an example implementation of the advertiser portal 316 is shown. The advertiser portal 316 includes a user interface 650, which may be implemented as a website, for access by the advertiser 320. An authentication module 654 stores credential information for each advertiser into a data store 656 and securely authenticates each advertiser to the advertiser portal 316.

A state selection module 658 allows the advertiser 320 to select states for sponsorship. For example, in a restaurant context, the advertiser 320 may set a bid price for the "French Laundry" state of the "Yelp" app. The advertiser 320 may condition the bid price on the French Laundry Yelp state being shown on a user device within a first screen of state results, or may condition the bid price on the French Laundry Yelp state being selected by a user. Still further, the advertiser 320 may condition the bid price on some further action by the user, such as installation of the "Yelp" app or on redemption of a coupon for the French Laundry within the "Yelp" app. In another example, the advertiser 320 may condition a bid price for the "French Laundry" state of the "OpenTable" app on reservations being made through the "OpenTable" app.

The developer may define multiple campaigns, and associate different selected states and bid prices with each campaign. Additional parameters may be associated with each campaign. For example only, a campaign may be limited to a specific operating system, such as Google's ANDROID. A campaign may be limited by time of day, day of week, and by geolocation of the user's device. Settings for each campaign are stored in the data store 656.

The advertiser 320 may specify that an app state should be shown when similar apps or states are included in the consideration set. The similarity may be explicitly specified by the advertiser—for example, by listing apps and/or app states similar to the advertiser's app state. In other implementations, the search system 132 may include a similarity assessment module (not shown) that assesses how similar two apps or app states are to each other.

In various implementations, the advertiser may choose to have their app or app state shown when the search query includes certain keywords. A keyword management module 662 allows the advertiser 320 to select keywords that will trigger a sponsored app or app state. The keywords may be triggered by language in a user device's search query, or based on text associated with apps or app states that are being considered for presentation to the user. The advertiser 320 identifies what sponsored app state should be included in search results when a keyword is detected. The keyword settings for each campaign are stored in the data store 656.

Keyword campaigns and state-based campaigns may be overlapping or may be defined independently. For example, a sponsored state in the state selection module 658 may be associated with a bid price, and the bid price may be used in ranking the sponsored state when the search system 132 is generating search results for a user device. Meanwhile, a keyword specified in the keyword management module 662 may be used to trigger inclusion of an app or app state that was not already under consideration for inclusion in search results. The advertiser may only specify that a sponsorship should be triggered by keyword in a situation where the advertiser does not want to pay to visually emphasize an app or app state that is already included in search results, but would be willing to pay for the app or app state to be included.

A coupon management module 666 allows the advertiser 320 to specify coupons that are associated with a state. The existence of coupons may be displayed on a user device at no cost to the advertiser 320 to provide users of the search system 132 with as many promotional opportunities as possible. Alternatively, the advertiser portal 316 may charge the advertiser 320 for placing coupon information next to a state. For example only, the advertiser 320 may indicate to the coupon management module 666 that a coupon (such as "$10 Off Prix Fixe Menu on Thursdays") is offered by the "French Laundry" state of the "Yelp" app. The advertiser portal 316 may then cause a coupon label to be displayed when the "French Laundry" state of the "Yelp" app is included in search results.

A user interface customization module 670 receives, from the advertiser 320, data controlling (or suggesting, depending on how sponsorship is processed by a user device) how sponsorship and coupons will appear, as specified by the developer. This may include graphical properties of a text box or button, such as whether a shadow is present, whether a 3D effect is used, font, etc.

A monetization preferences module 674 records monetization preferences for the advertiser 320 in the data store 656. The monetization preferences module 674 receives payment information for the advertiser 320 and may also manage bid prices for sponsorships set using the state selection module 658, the keyword management module 662, and the coupon management module 666.

A search service communication module 678 may periodically update the data store 656 based on the list of apps and the list of app states recognized by the search system 132. The general data, such as the list of apps and app states, may be stored in unencrypted form. Meanwhile, any data specific to the advertiser 320 may be encrypted while in the data store 656. As preferences change in the data store 656, the search service communication module 678 provides the updated preferences to the search system 132 for use in identifying and scoring apps and app states.

FIG. 8 illustrates an example environment of the search system 132. The search system 132 is a collection of computing devices that receives search queries from user devices via the network 324. Although shown in FIGS. 1A-1C as a smartphone 104, a user device can be any suitable user computing device, such as a tablet computing device, a laptop computing device, a gaming device, a vehicle infotainment device, a wearable device, or a smart appliance (such as a smart refrigerator or smart television). In response to receiving a search query from the user device, the search system 132 generates search results based on the search query, as described in more detail below.

In some implementations, user devices communicate with the search system 132 via a partner computing system (not illustrated). The partner computing system may be a computing system of a third party that leverages the search functionality of the search system 132. The partner computing system may be owned by a company or organization other than the operator of the search system 132. Examples of such third parties include Internet service providers, aggregated search portals, and mobile phone providers. The user devices may send search queries to the search system 132 and receive search results from the search system 132, all via the partner computing system. The partner computing system may provide a customized user interface to the user devices and/or may modify the search experience provided on the user devices.

The example implementation of the search system 132 shown in FIG. 8 includes a search module 700, which references data stored in a search data store 704. Based on the data stored in the search data store 704, the search module 700 services queries and provides relevant app results. The data in the search data store 704 may be obtained from data sources 708. The search data store 704 may be maintained and updated by the search module 700 and/or a maintenance component (not shown) of the search system 132.

The search data store 704 may be updated with databases, indices, tables, files, and other data structures, which may be populated by the data sources 708. The search data store 704 may store application records, which may be in the format of FIG. 9A, and may store function records (also called application state records), which may be in the format of FIG. 9B.

Parsers and other ETL (extract, transform, and load) processes may adapt data from the data sources 708 for storage in the search data store 704. In some implementations, data may be manually entered and/or manually transformed into a format usable by the search data store 704. The data sources 708 may include data from application developers 708-1, such as application developers' websites and data feeds provided by developers.

The data sources 708 may include operators of digital distribution platforms 708-2 configured to distribute native applications to user devices. Example digital distribution platforms 708-2 include the Google Play® digital distribution platform by Google, Inc., the Application Store® digital distribution platform by Apple, Inc. and Windows Phone® store by Microsoft Corp. The data sources 708 may also include other websites, such as blogs 708-3, application reviews websites 708-4, and social networking sites 708-5, such as Facebook® by Facebook, Inc. and Twitter® by Twitter, Inc.

The data sources 708 may also include online databases 708-6 of data related to movies, television programs, music, restaurants, etc. Each of the data sources 708 may have independent ontologies and may be updated at different rates. Therefore, the search data store 704 may be updated from each of the data sources 708 at different rates. In addition, credibility and accuracy of data may differ across the data sources 708. Measures of reliability, timeliness, and accuracy may be stored in the search data store 704 and may be used to weight search results obtained from those data sources 708.

Figure 9B:
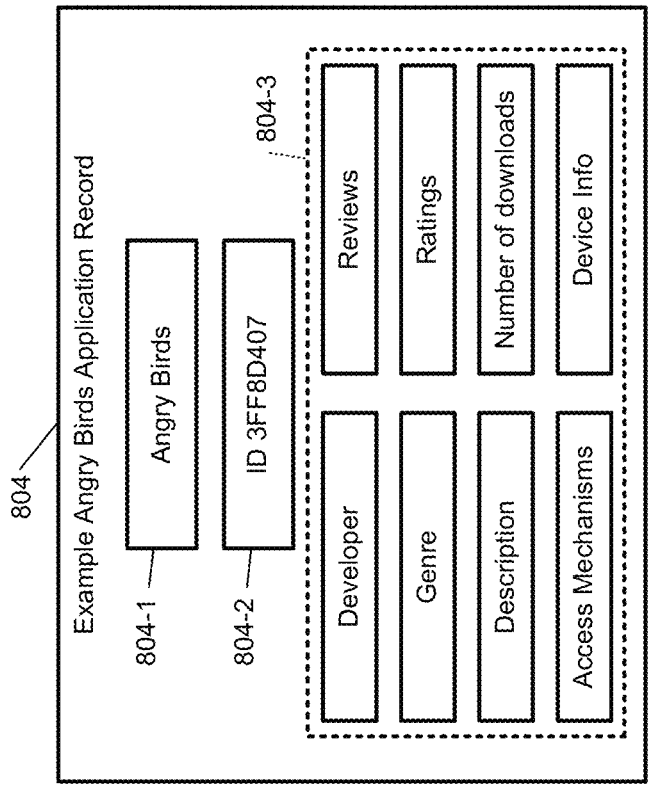
FIG. 9B is a graphical representation of an example application record according to the format of FIG. 9A.
Figure 9A:
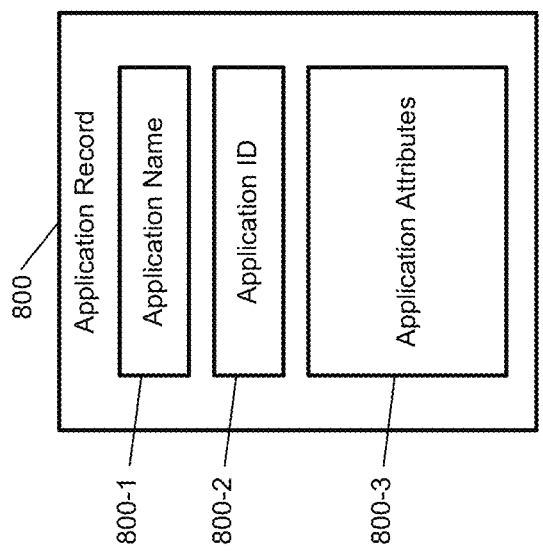
FIG. 9A is a graphical representation of an example application record format.

In FIG. 9A, an example format of an application record 800 includes an application name 800-1, an application identifier (ID) 800-2, and application attributes 800-3. The application record 800 generally represents data that can be stored in the search data store 704 for a specific application. The search data store 704 may include thousands or millions of records having the structure specified by the application record 800. The application ID 800-2 uniquely identifies an application in the search data store 704. The application ID 800-2 may be assigned by the search system 132 and may therefore be independent of any ID assigned by, for example, a digital distribution platform.

A single value for the application ID 800-2 may cover multiple application editions. The term "edition" applies to multiple versions of a single app and may also apply to versions of that app released for alternative operating systems. For example only, Angry Birds (as shown in FIG. 9B) may be available on Android and iOS platforms and, for each platform, may have a series of versions bug fixes are released and as the application is updated to take advantage of, and to adapt to, newer versions of operating system.

An example Angry Birds application record 804 includes a name 804-1 of "Angry Birds" and a unique ID 804-2 expressed in hexadecimal as 0x3FF8D407. Attributes 804-3 for Angry Birds may include a name of the developer of Angry Birds, text reviews of Angry Birds, a genre indicator for Angry Birds (such as "Games," or sub-genre "Physics-Based Games"), ratings (such as star ratings) for Angry Birds, a textual description (which may be provided by the developer), a number of downloads (which may be restricted to the most recent edition or could be for all editions), access mechanisms (how to open Angry Birds when already installed or how to install Angry Birds when not yet installed), and device info (for example, minimum requirements of operating system, hardware, and resolution for best operation).

The term "software application" can refer to a software product that causes a computing device to perform a function. In some examples, a software application may also be referred to as an "application," an "app," or a "program." Software applications can perform a variety of different functions for a user. For example, a restaurant reservation application can make reservations for restaurants, and an Internet media player application can stream media (such as a song or movie) from the Internet.

In some examples, a single software application can provide more than one function. For example, a restaurant reservation application may also allow a user to read user reviews for a restaurant in addition to making reservations. As another example, an Internet media player application may also allow a user to perform searches for digital media, purchase digital media, generate media playlists, and share media playlists.

The functions of an application can be accessed using native application editions of the software application and/or web application editions of the software application. A native application edition (or "native application") is, at least in part, installed on a user device. In some scenarios, a native application is installed on a user device, but accesses an external resource (e.g., an application server) to obtain data from the external resource. For example, social media applications, weather applications, news applications, and search applications may respectively be accessed by one or more native application editions that execute on various user devices. In such examples, a native application can provide data to and/or receive data from the external resource while accessing one or more functions of the software application.

In other scenarios, a native application is installed on the user device and does not access any external resources. For example, some gaming applications, calendar applications, media player applications, and document viewing applications may not require a connection to a network to perform a particular function. In these examples, the functionality of the software product is encoded in the native application itself.

Web application editions (also referred to as "web applications") of a software application may be partially implemented by a user device (such as a web browser executing the user device) and partially implemented by a remote computing device (such as a web server or application server). For example, a web application may be an application that is implemented, at least in part, by a web server and accessed by a web browser native to the user device. Example web applications include web-based email, online auctions websites, social-networking websites, travel booking websites, and online retail websites. A web application accesses functions of a software product via a network. Example implementations of web applications include web pages and HTML5 application editions.

When rendering a set of app search results, a user device displays a set of user-selectable links that can be selected by a user of the user device. A user-selectable link may include one or more underlying access mechanisms. A user-selectable link, when selected by a user, causes the user device to access a software application using an edition of the software application identified by the access mechanism.

Examples of access mechanisms include application access mechanisms, web access mechanisms, application download addresses, and scripts. An application access mechanism may be a string that includes a reference to a native application and indicates one or more operations for the user device to perform. If a user selects a user selectable link including an application access mechanism, the user device may launch the native application referenced in the application access mechanism.

In some implementations, any combination of the operating system of the user device, a search application executed by the user device, a native application executed by the user device, and/or a web browser executed by the user device can launch the native application referenced in the application access mechanism. An application resource identifier is an example application access mechanism.

A web access mechanism may be a string that includes a reference to a web application edition of a software product, and indicates one or more operations for a web browser to execute. A web access mechanism may be a resource identifier that includes a reference to a web resource (e.g., a page of a web application/website). For example, a web access mechanism may refer to a uniform resource locator (URL) used with hypertext transfer protocol (HTTP). If a user selects a user-selectable link including a web access mechanism, the user device may launch a web browser application and may pass the resource identifier to the web browser.

An application download access mechanism may indicate a location (such as a digital distribution platform) where a native application can be downloaded in the scenario where a native application edition of the application is not installed on the user device. If a user selects a user-selectable link including an application download access mechanism, the user device may access a digital distribution platform from which the referenced native application edition may be downloaded. The user may opt to download the native application edition. Upon installation, the user device may automatically launch the native application edition.

A script access mechanism is a set of instructions that, when executed by the user device, cause the user device to access a resource indicated by the script. For example, the script may instruct an operating system of the user device to launch a digital distribution platform interface application; browse to the specified native application within the digital distribution platform interface application; install the specified native application; and then open the specified native application.

Figure 10B:
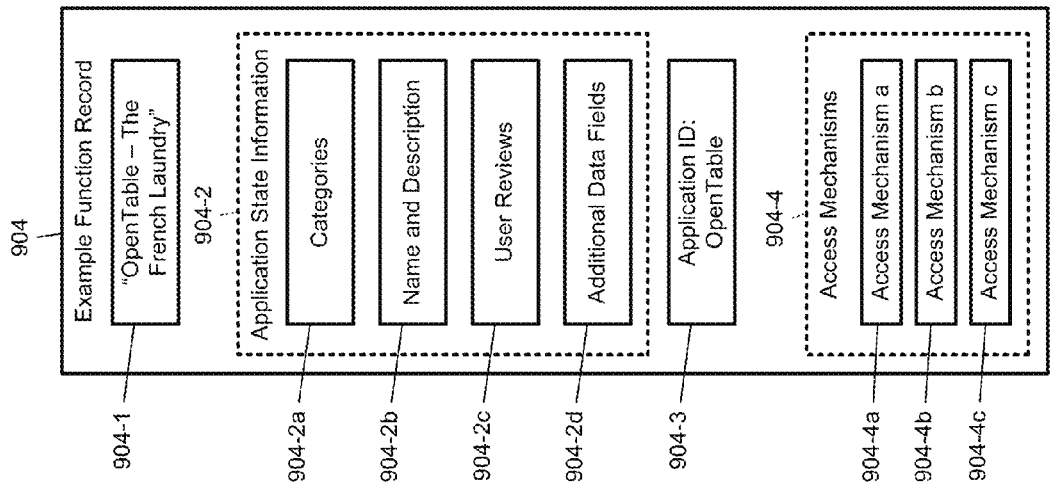
FIG. 10B is a graphical representation of an example function record according to the format of FIG. 10A.
Figure 10A:
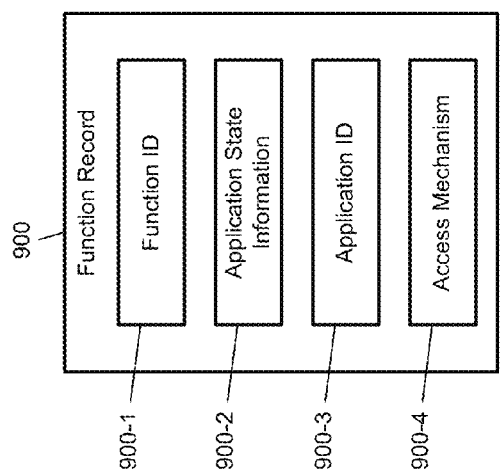
FIG. 10A is a graphical representation of an example function record format.

In FIG. 10A, an example format of a function record 900 includes a function identifier (ID) 900-1, application state information 900-2, an application identifier (ID) 900-3, and one or more access mechanisms 900-4 used to access functionality provided by an application.

The function ID 900-1 may be used to identify the function record 900 among the other function records 900 included in the search data store 704. The function ID 900-1 may be a string of alphabetic, numeric, and/or special (e.g., punctuation marks) characters that uniquely identifies the associated function record 900. In some examples, the function ID 900-1 describes a function and/or an application state in human-readable form. For example, the function ID 900-1 may include the name of the application referenced in the access mechanisms 900-4.

In a specific example, a function ID 900-1 for an Internet music player application may include the name of the Internet music player application along with the song name that will be played when the Internet music player application is set into the state defined by the access mechanism 900-4 included in the function record 900. In some examples, the function ID 900-1 includes a string formatted similarly to a uniform resource locator (URL), which may include an identifier for the application and an identifier of the state within the application. In other implementations, a URL used as the function ID 900-1 may include an identifier for the application, an identifier of a function to be provided by the application, and an identifier of an entity that is the target of the function.

For example only, see FIG. 10B, which shows an example function record 904 associated with the OPENTABLE® application, developed by OpenTable, Inc. The OPENTABLE® application is a restaurant-reservation application that allows users to search for restaurants, read reviews, and make restaurant reservations. The example function record 900 of FIG. 10B describes an application state of the OPENTABLE® application in which the OPENTABLE® application accesses information for THE FRENCH LAUNDRY® restaurant, a Yountville, Calif. restaurant. A function ID 904-1 for the example function record 904 is shown as "OpenTable—The French Laundry."

An alternative to the displayed function ID 904-1 could be based on a triplet of information: {application, function, entity}. The triplet for the function record 904 may be {"OpenTable", "Show Reviews", "The French Laundry"}. As mentioned above, this triplet may be formatted as a URL, such as the following: "func://www.OpenTable.com/Show_Reviews/The_French_Laundry". Note that a different namespace is used ("func://") to differentiate from the standard web namespace ("http://"), as the URL-formatted ID may not resolve to an actual web page. For example only, the OpenTable website may use a numeric identifier for each restaurant in their web URLs instead of the human-readable "The_French_Laundry."

Continuing with FIG. 10A, the application state information 900-2 may include data that describes an application state into which an application is set according to the access mechanisms 900-4 in the function record 900. The types of data included in the application state information 900-2 may depend on the type of information associated with the application state and the functionality specified by the access mechanisms 900-4. The application state information 900-2 may include a variety of different types of data, such as structured, semi-structured, and/or unstructured data. The application state information 900-2 may be automatically and/or manually generated and updated based on documents retrieved from the data sources 708.

In some examples, the application state information 900-2 includes data presented to a user by an application when in the application state corresponding to the function record 900. For example, if the function record 900 is associated with a shopping application, the application state information 900-2 may include data that describes products (e.g., names and prices) that are shown in the application state corresponding to the function record 900. As another example, if the function record 900 is associated with a music player application, the application state information 900-2 may include data that describes a song (e.g., name and artist) that is displayed and/or played when the music player application is set to the specified application state.

When the function record 900 corresponds to a default state of an application, the application state information 900-2 may include information generally relevant to the application and not to any particular application state. For example, the application state information 900-2 may include the name of the developer of the application, the publisher of the application, a category (e.g., genre) of the application, a text description of the application (which may be specified by the application's developer's), and the price of the application. The application state information 900-2 may also include security or privacy data about the application, battery usage of the application, and bandwidth usage of the application. The application state information 900-2 may also include application statistics, such as number of downloads, download rate (for example, average downloads per month), download velocity (for example, number of downloads within the past month as a percentage of total downloads), number of ratings, and number of reviews.

The example function record 904 includes application state information 904-2, including a restaurant category field 904-2a of THE FRENCH LAUNDRY® restaurant, a name and text description field 904-2b of THE FRENCH LAUNDRY® restaurant, user reviews field 904-2c of THE FRENCH LAUNDRY® restaurant, and additional data fields 904-2d.

The restaurant category field 904-2a may include multiple categories under which the THE FRENCH LAUNDRY® restaurant is categorized, such as the text "French cuisine" and "contemporary," for example. The name and description field 904-2b may include the name of the restaurant ("The French Laundry") and text that describes THE FRENCH LAUNDRY® restaurant. The user reviews field 904-2c may include text of user reviews for THE FRENCH LAUNDRY® restaurant. The additional data fields 904-2d may include additional data for THE FRENCH LAUNDRY® restaurant that may not specifically fit within the other defined fields, such as a menu, prices, and operating hours.

Continuing with FIG. 10A, the application ID 900-3 uniquely identifies an application associated with the function record 900. For example, a value for application ID 904-3 in the function record 904 uniquely identifies the OpenTable application. The application ID 904-3 may refer to a canonical OpenTable software product that encompasses all of the editions of the OpenTable application, including all the native versions of the OpenTable application across platforms (for example, IOS® and ANDROID®) and any web editions of the OpenTable application.

The access mechanisms 900-4 specify one or more ways that the state specified by the function record 900 can be accessed. For any given user device, only some of the access mechanisms 900-4 may be relevant. For illustration, the example function record 904 depicts three access mechanisms 904-4, including access mechanism "a" 904-4a, access mechanism "b" 904-4b, and access mechanism "c" 904-4c.

For example, the access mechanism 900-4a may include a reference to a native iOS edition of the OPENTABLE® application along with one or more operations to be performed by the user device. For example, the access mechanism 900-4a may include an application resource identifier for the native iOS edition of the OPENTABLE® application and one or more operations that navigate to the state in the OPENTABLE® application for THE FRENCH LAUNDRY®.

The access mechanism 900-4b may include a reference to a native ANDROID edition of the OPENTABLE® application along with one or more operations to be performed by the user device to navigate to the state in the ANDROID OPENTABLE® application for THE FRENCH LAUNDRY®. The access mechanism 900-4c may include a reference to a web edition of the OPENTABLE® application, such as a URL that corresponds to a web page for THE FRENCH LAUNDRY® restaurant on the OPENTABLE® web site.

Figure 11:
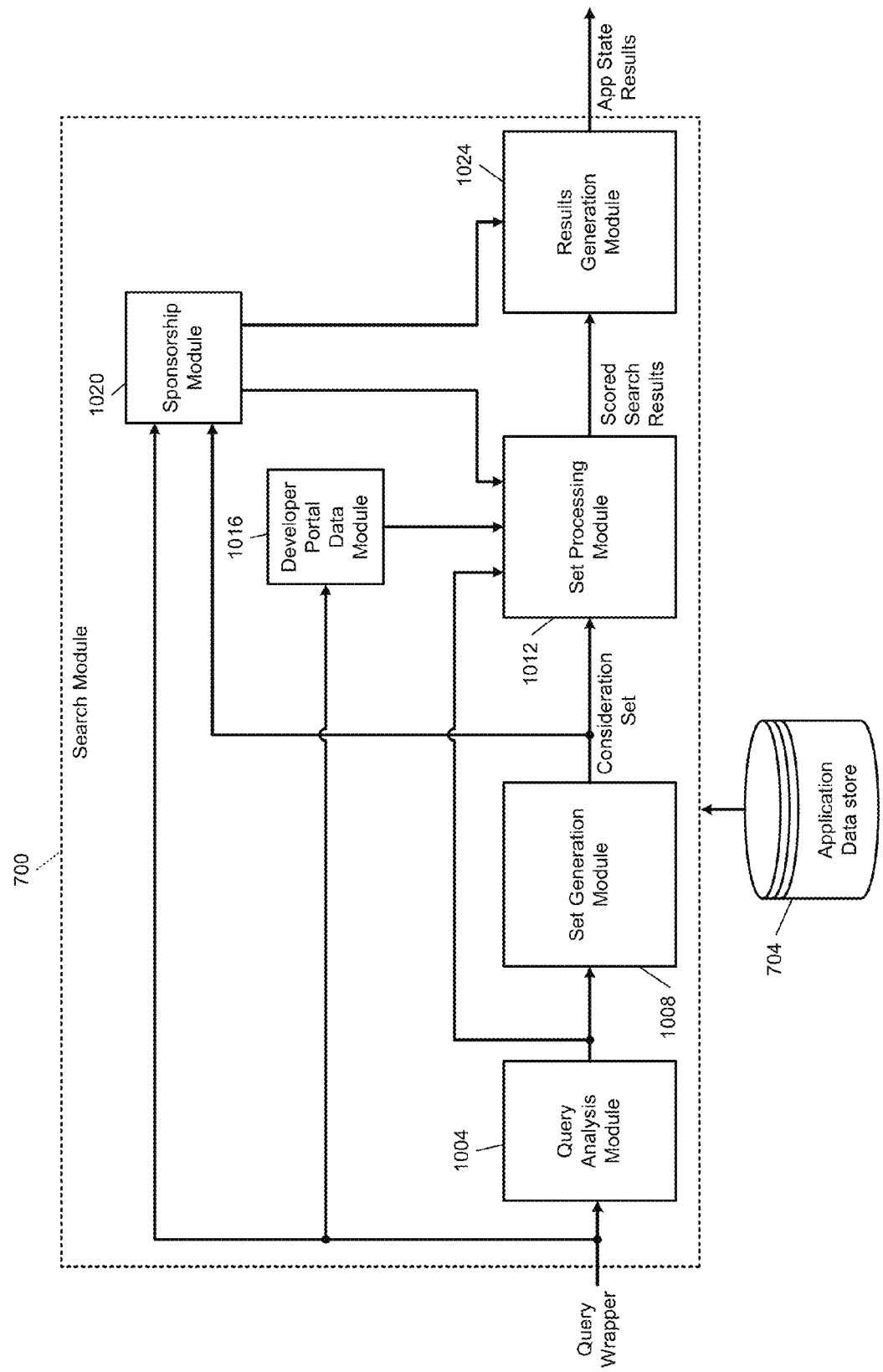
FIG. 11 is a functional block diagram of an example implementation of the search module of FIG. 8.

In FIG. 11, an example implementation of the search module 700 includes a query analysis module 1004 that receives the query wrapper. The query analysis module 1004 analyzes the text query from the query wrapper. For example, the query analysis module 1004 may tokenize the query text, filter the query text, perform word stemming, synonymization, and stop word removal. The query analysis module 1004 may also analyze additional data stored within the query wrapper. The query analysis module 1004 provides the tokenized query to a set generation module 1008.

The set generation module 1008 identifies a consideration set of application and function records based on the query tokens. Some or all of the contents of the records of the search data store 704 may be indexed in inverted indices. In some implementations, the set generation module 1008 uses the Apache Lucene software library by the Apache Software Foundation to identify records from the inverted indices.

The set generation module 1008 may search the inverted indices to identify records containing one or more query tokens. As the set generation module 1008 identifies matching records, the set generation module 1008 can include the unique ID of each identified record in the consideration set. For example, the set generation module 1008 may compare query terms to the application name 800-1 and the application attributes 800-3 (such as a text description and user reviews) of the application record 800. The set generation module 1008 may also compare the query terms to the application state information 900-2 (such as application name and description and user reviews) of the function record 900.

Further, in some implementations, the set generation module 1008 may determine an initial score of the record with respect to the search query. The initial score may indicate how well the contents of the record matched the query. For example, the initial score may be a function of the term frequency-inverse document frequency (TF-IDF) values of the respective query terms.

A set processing module 1012 receives the unique IDs from the set generation module 1008 and determines a result score for some or all of the IDs. A result score indicates the relevance of an application or function, given the tokenized query and context parameters, with a higher score indicating a greater perceived relevance.

For example, other items in the query wrapper may act as context parameters. Geolocation data may limit the score (or simply remove altogether) of apps that are not pertinent to the location of the user device. A blacklist in the query wrapper may cause the set processing module 1012 to remove app records and/or function records from the consideration set that match the criteria in the blacklist, or to set their score to a null value, such as zero.

The set processing module 1012 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of words in the search query, the popularity of the search query, and the expected frequency of the words in the search query. Record-query scoring features may include parameters that indicate how well the terms of the search query match the terms of the record indicated by the corresponding ID.

The set processing module 1012 may include one or more machine learned models (such as a supervised learning model) configured to receive one or more scoring features. The one or more machine learned models may generate result scores based on at least one of the function ID scoring features, the record scoring features, the query scoring features, and the record-query scoring features.

For example, the set processing module 1012 may pair the search query with each ID and calculate a vector of features for each {query, ID} pair. The vector of features may include one or more record scoring features, one or more query scoring features, and one or more record-query scoring features. In some implementations, the set processing module 1012 normalizes the scoring features in the feature vector. The set processing module 1012 can set non-pertinent features to a null value or zero.

The set processing module 1012 may then input the feature vector for one of the application or function IDs into a machine-learned regression model to calculate a result score for the ID. In some examples, the machine-learned regression model may include a set of decision trees (such as gradient-boosted decision trees). Additionally or alternatively, the machine-learned regression model may include a logistic probability formula. In some implementations, the machine-learned task can be framed as a semi-supervised learning task, where a minority of the training data is labeled with human-curated scores and the rest are used without human labels.

The machine-learned model outputs a result score of the ID. The set processing module 1012 can calculate result scores for each of the IDs that the set processing module 1012 receives. The set processing module 1012 associates the result scores with the respective IDs and outputs the most relevant scored IDs.

A developer portal data module 1016 stores data provided by the developer portal 304. For example, when the developer portal data module 1016 identifies the app that sent the query wrapper, the developer portal data module 1016 may provide a pre-arranged blacklist to the set processing module 1012. The developer portal data module 1016 may also specify other parameters to the set processing module 1012, such as to exclude any application records and function records tied to the application that transmitted the query wrapper; this avoids returning self-referential results.

A sponsorship module 1020 receives the query wrapper and identifies apps and functions relevant to the query for which sponsorship has been indicated by an advertiser. For example, the sponsorship module 1020 may receive the consideration set from the set generation module 1008 and identify apps and functions within the consideration set for which sponsorship is desired. For example, the apps and/or functions in the consideration set that have corresponding sponsorship bids may be ranked. Those apps or functions with the highest initial score may be selected as sponsored links and provided to the set processing module 1012 for inclusion in the search results.

The set processing module 1012 may score the IDs provided by the sponsorship module 1020, and if the result score is high enough, output the sponsored apps or functions as part of the ordered search results. In other implementations, the sponsorship module 1020 may supply a tag with one or more of the IDs instructing the set processing module 1012 to include the IDs as sponsored results regardless of their result score.

The sponsorship module 1020 may operate according to a variety of targeting parameters, which may be specified by an advertiser, such as by using the developer portal 304. For example, the advertiser may desire to have their app shown when similar apps are included in the consideration set. The similarity may be explicitly specified by the advertiser—for example, by listing apps similar to the advertiser's app. In other implementations, the search system 132 may include a similarity assessment module (not shown) that assesses how similar two apps are to each other. The similarity assessment module may determine the similarity between each of the apps in the consideration set with each of the potential sponsored apps. In various implementations, the advertiser may choose to have their app shown when the search query includes certain keywords.

The sponsorship module 1020 may take into account whether a sponsored app is already installed on the user device from which the query wrapper was received. An advertiser may only be willing to pay a reduced price (or even nothing) to promote their app if their app is already installed on the user device.

The sponsorship module 1020 may select sponsored apps based on bid prices set by advertisers. An advertiser may set different bid prices to promote their app based on, for example, whether their app is already installed, how similar their app is to other apps in the result set, etc. The sponsorship module 1020 may choose, for inclusion in the ordered search results, apps having the highest bid prices for the present search.

A results generation module 1024 may choose specific access mechanisms from the application records and function records chosen by the set processing module 1012. The results generation module 1024 then prepares a results set to return to the user device. Although named "app state results," some of the access mechanisms may be to a default state (such as a home page) of an app—these may be special cases of a function record or simply an application record.

The results generation module 1024 may choose access mechanisms based on the operating system identity and version for the user device to which the results are being transmitted. For example, a script to download, install, open, and navigate to a designated state may be fully formed for a specific operating system by the results generation module 1024.

If the results generation module 1024 determines that none of the native access mechanisms are likely to be compatible with the user device, the search module 700 may send a web access mechanism to the user device. If no web access mechanism is available, or would be incompatible with the user device for some reason (for example, if the web access mechanism relies on Java®, which is not installed on the user device), the results generation module 1024 may omit the result.

Figure 12:
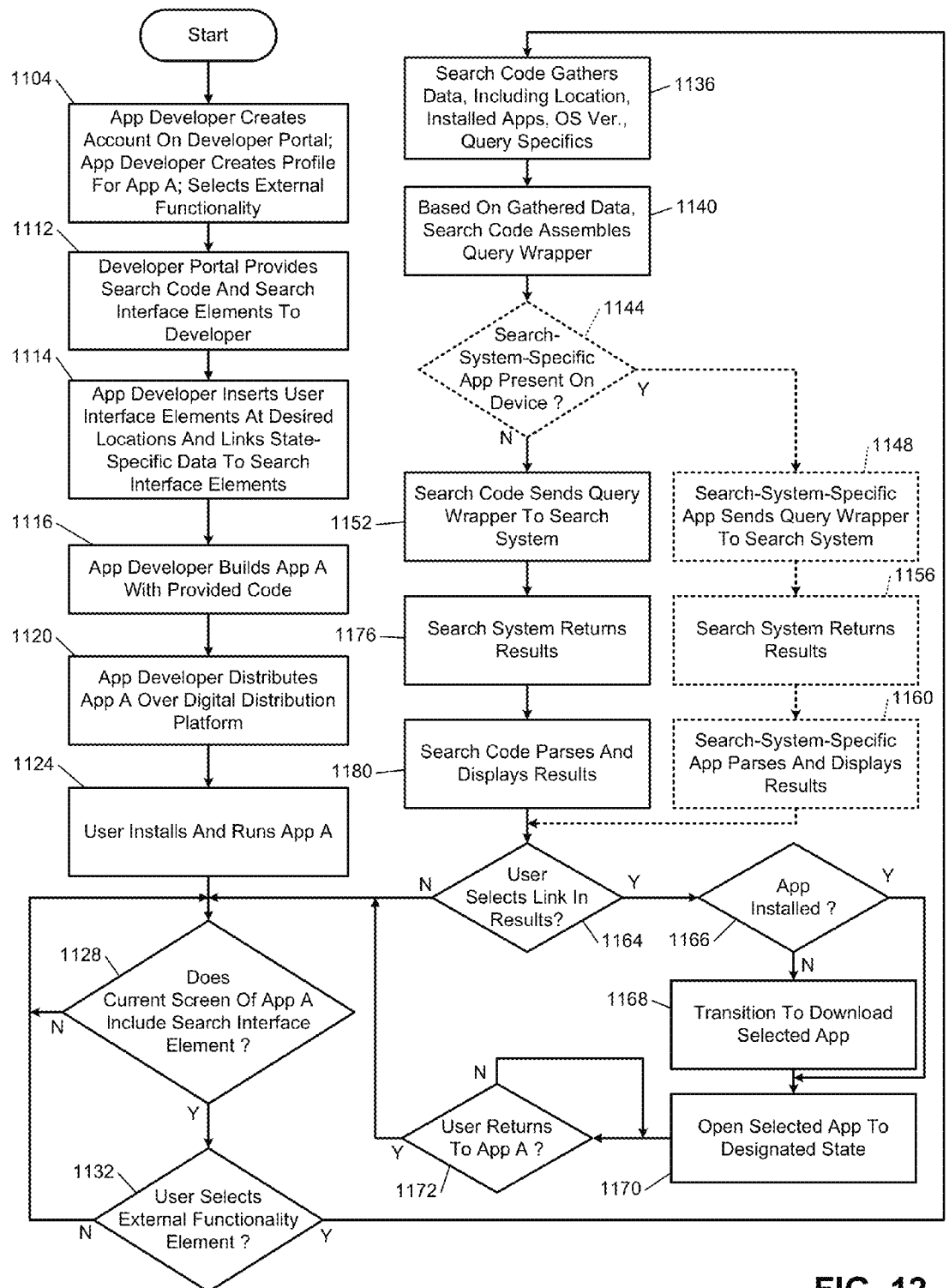
FIG. 12 is a flowchart of overall operation of the development system and user interaction.

In FIG. 12, an overall operational flowchart begins at 1104 where an app developer creates an account on the developer portal, creates a profile for a first app (App A), and selects external functionality for the developer portal to introduce into App A. At 1112, the developer portal provides search code and search interface elements to the developer for incorporation into App A.

At 1114, the developer inserts user interface elements at desired locations within states of App A and selectively links state-specific data to search interface elements. For example, the developer may supply a text title of a state to a search interface element in that state. As another example, for a search interface element adjacent to a movie theatre, the developer may supply a name and/or address of the movie theatre to the search interface element for formation of a query.

At 1116, the app developer builds App A with the provided code. At 1120, the app developer distributes App A over a digital distribution platform. Once App A is available on the digital distribution platform, a user can install and run App A at 1124. At 1128, control determines whether a current screen (or state) of App A includes a search interface element, such as an external functionality button. If so, control transfers 1132; otherwise, control remains at 1128.

At 1132, control determines whether the user has selected (such as by clicking or tapping) the external functionality element. If so, control transfers to 1136; otherwise, control returns to 1128. At 1136, the search code in App A gathers data including geolocation, apps installed on the device, a version of the operating system installed on the device, etc. The search code may also gather state-specific data, such as a title of a present state or information identifying a relevant entity (such as the name of a movie or the name of a movie theatre). At 1140, the search code, based on the gathered data, assembles a query wrapper.

At 1144, an optional decision is made. In certain circumstances, a developer may prefer to hand off presentation of search results to an app operated by the developer portal or by the search system. If this is desired by the developer, the decision at 1144 will transfer to 1148 when the search-system-specific app is present on the device. If the search-system-specific app is not present on the device, or if the developer of App A does not wish to hand off the results presentation to the search-system-specific app, control continues at 1152.

At 1148, the search-system-specific app sends the query wrapper to the search system and at 1156 the search system returns app results. At 1160, the search-system-specific app parses and displays the results to the user. Control then continues at 1164.

At 1164, if the user selects one of the links in the results, control transfers to 1166; otherwise, if the user exits from the result listing, control returns to 1128. At 1166, control determines whether the app referenced by the link is already installed. If so, control transfers to 1170; otherwise, control transfers to 1168.

At 1168, control downloads the app and continues at 1170. The download of the app may be performed as specified by an access mechanism corresponding to the specified link. At 1170, control opens the selected app and navigates to the specified state, as directed by the access mechanism. Control continues at 1172, where if the user returns to App A from this newly opened app, control transfers to 1128; otherwise, control remains at 1172.

Returning to 1152, search code embedded in App A sends the query wrapper to a predefined search system, which may be specified by a fully qualified domain name or one or more IP (Internet Protocol) addresses. At 1176, the search system returns app results. At 1180, the search code embedded in App A parses and displays the results from the search system to the user. As discussed above, the search results may be adjusted based on which apps are already installed—for example, filtering out states of apps not yet installed. In addition, states may be filtered out when account information indicates that the state will not provide the desired functionality to the user. For example, if a state corresponding to streaming a movie was returned, but the movie is not included within the user's subscription, the corresponding state may be moved down in the rankings or removed altogether. Control then continues at 1164.

Figure 13:
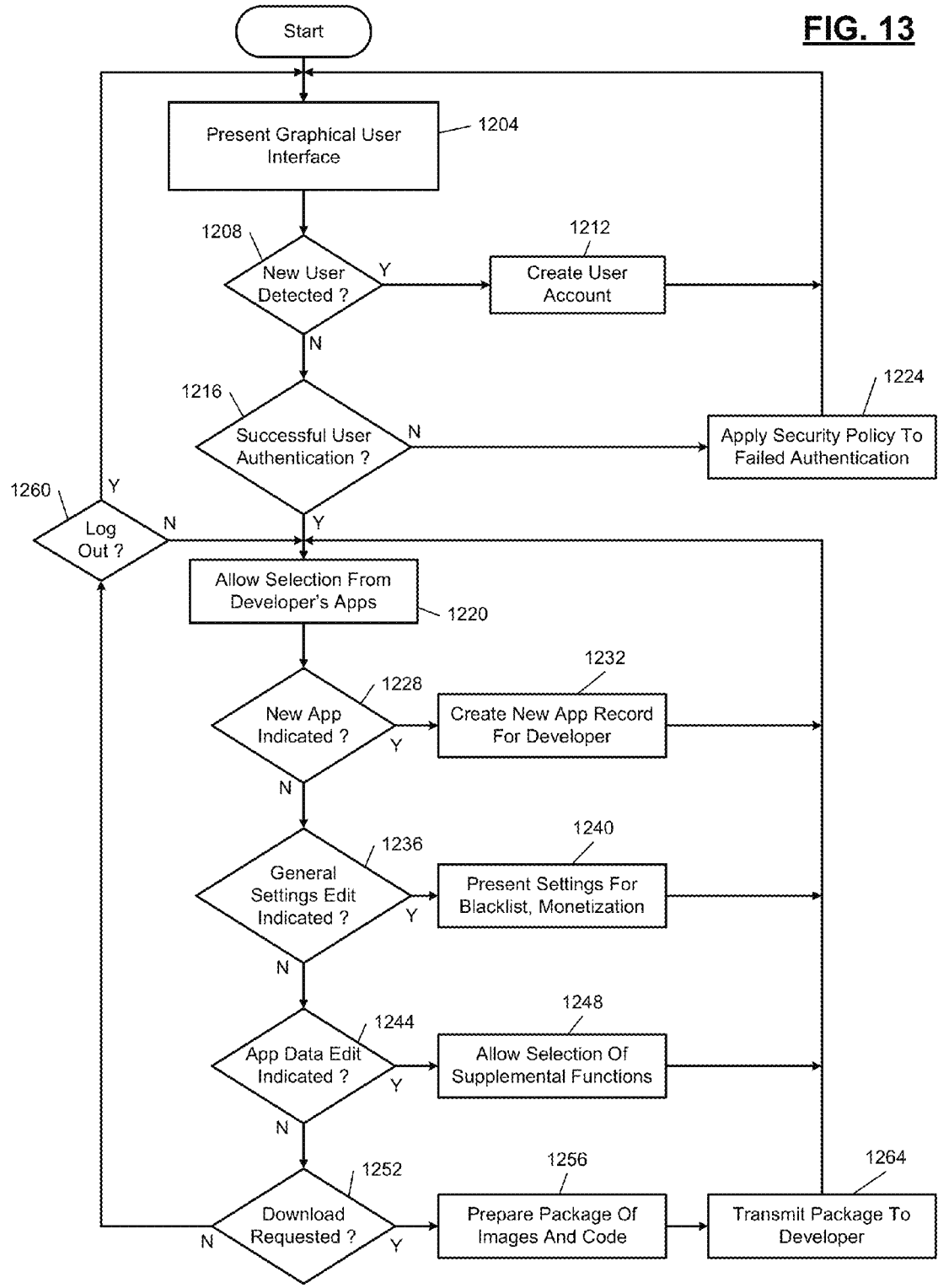
FIG. 13 is a flowchart of example operation of a development portal.

In FIG. 13, example operation of a developer portal begins at 1204, where a graphical user interface is presented, such as by hosting a website. Control continues at 1208, where if a new user is detected, control creates a user account at 1212 and returns to 1204. If an existing user is detected, control transfers to 1216, where upon successful user authentication, control transfers to 1220. If the user does not successfully authenticate, control transfers to 1224. At 1224, a security policy is applied to the failed authentication.

For example only, the security policy may include exponentially increasing a time that the user has to wait before attempting to authenticate again. In addition, the security policy may include a set number of unsuccessful attempts before the user is prevented from logging in without manual intervention at the developer portal. Further, unsuccessful authentication may be logged and may be communicated to a predetermined email address of the user.

At 1220, control allows selection from among the developers' apps. At 1228, if a new app is indicated by the developer, control transfers to 1232; otherwise, control transfers to 1236. At 1232, control creates a new app record for that developer and control returns to 1220. At 1236, control determines whether the developer has indicated that general settings should be edited. If so, control transfers to 1240, where settings are presented for editing. These settings may include a global blacklist, monetization policies, etc.

Control then returns to 1220. If, at 1236, the developer has not indicated that general settings should be edited, control transfers to 1244. At 1244, control determines whether the developer has indicated that data corresponding to an app should be edited. If so, control transfers to 1248; otherwise, control transfers to 1252. At 1248, control allows for selection of supplemental functions, which indicate external functionality that the developer wants to introduce to their app. In addition, settings for already selected functions may be changed, such as function specific blocked apps and user interface options. Control then returns to 1220.

At 1252, if a download has been requested, control transfers to 1256; otherwise, control transfers to 1260. At 1260, if the user logs out, control returns to 1304; otherwise, control returns to 1220. At 1256, control prepares a package of images and code to implement the desired external functionality for the selected app. At 1264, control transmits the package to the developer for the developer's integration into an app under development. Control then returns to 1220.

Figure 14:
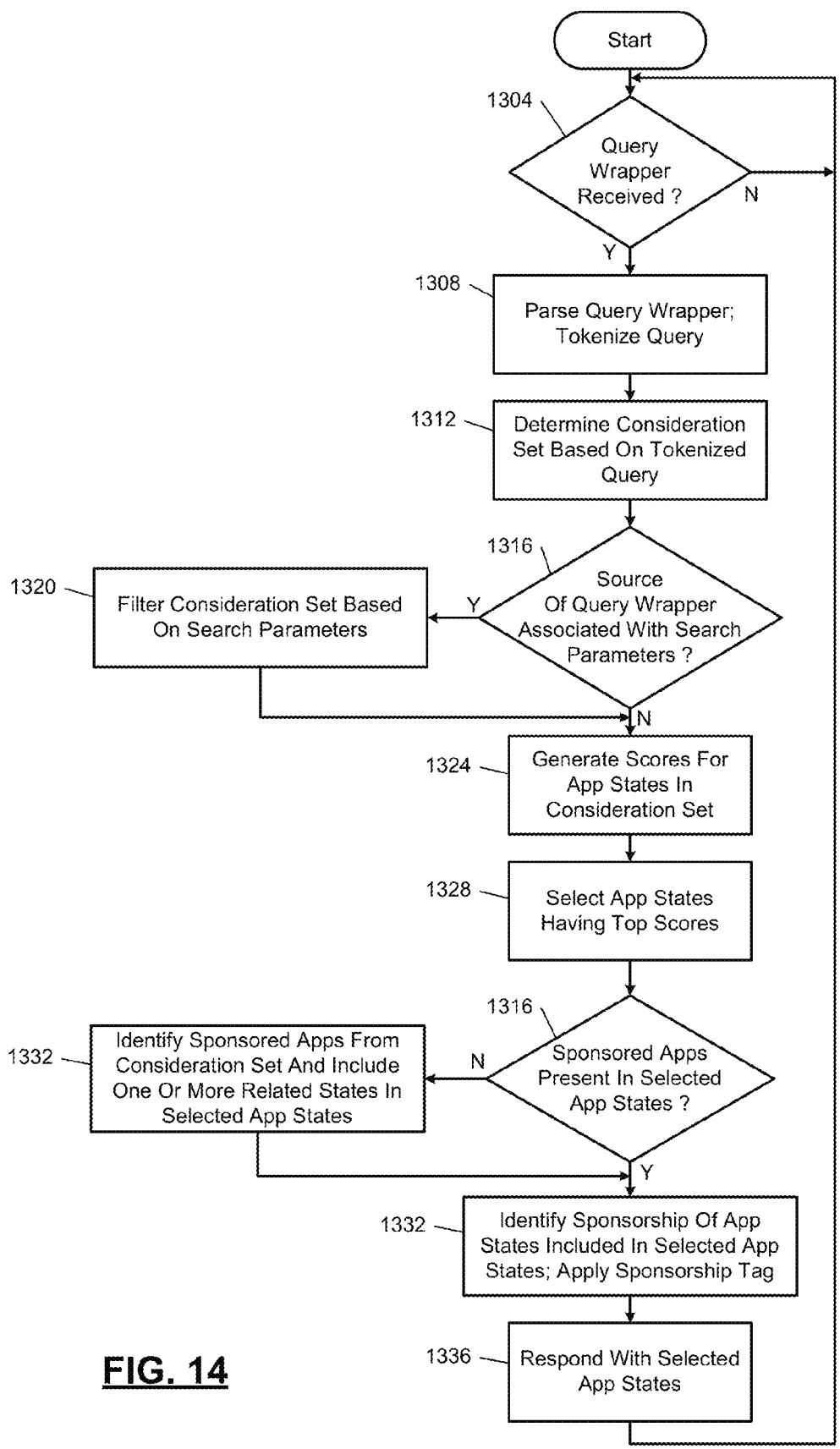
FIG. 14 is a flowchart of example operation of the search system of FIG. 8.

In FIG. 14, a flowchart of example operation of the search system 132 is shown. Control starts at 1304, where if a query wrapper has been received, control transfers to 1308; otherwise, control returns to 1304. At 1308, control parses the query wrapper, which may include parsing and tokenizing the query wrapper. Control continues at 1312, where control determines a consideration set of apps based on the identified tokens.

At 1316, control determines whether an apparent source of the query wrapper is associated with search parameters. If so, control transfers to 1320; otherwise, control transfers to 1324. At 1320, the search parameters may have been provided by the developer portal 304 after specification by the developer. These search parameters may include a blacklist. Control therefore filters the consideration set, such as by removing apps from the consideration set that are found in the blacklist. Control then continues at 1324.

At 1324, control generates scores for each app in the consideration set. At 1328, control selects apps having the top scores. At 1332, control identifies sponsored apps present in the consideration set and, if not already present within the selected apps identified simply based on score, includes one or more sponsored apps in the selected apps. At 1336, control responds with the selected apps. As described above, this response may include information from the search data store 704, such as access mechanisms, icons, ratings, etc. Control then returns to 1304.

Modules and data stores included in the search system 132 and the developer portal 304 represent features that may be included in the search system 132 and the developer portal 304 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components.

In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

In some implementations, the search system 132 and the developer portal 304 may be a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above.

For example, each of the one or more computing devices may include any combination of processing units, memory components, I/O components, and interconnect components described above. The one or more computing devices of the search system 132 and the developer portal 304 may also include various human interface devices, including display screens, keyboards, pointing devices (e.g., a mouse), touchscreens, speakers, and microphones. The computing devices may also be configured to communicate with additional devices, such as external memory (e.g., external HDDs).

The one or more computing devices of the search system 132 and the developer portal 304 may be configured to communicate with the network 324. The one or more computing devices of the search system 132 and the developer portal 304 may also be configured to communicate with one another (e.g., via a computer network). In some examples, the one or more computing devices of the search system 132 and the developer portal 304 may include one or more server computing devices configured to communicate with user devices (e.g., receive query wrappers and transmit search results), gather data from data sources 708, index data, store the data, and store other documents.

The one or more computing devices may reside within a single machine at a single geographic location in some examples. In other examples, the one or more computing devices may reside within multiple machines at a single geographic location. In still other examples, the one or more computing devices of the search system 132 and the developer portal 304 may be distributed across a number of geographic locations.

Figure 15:
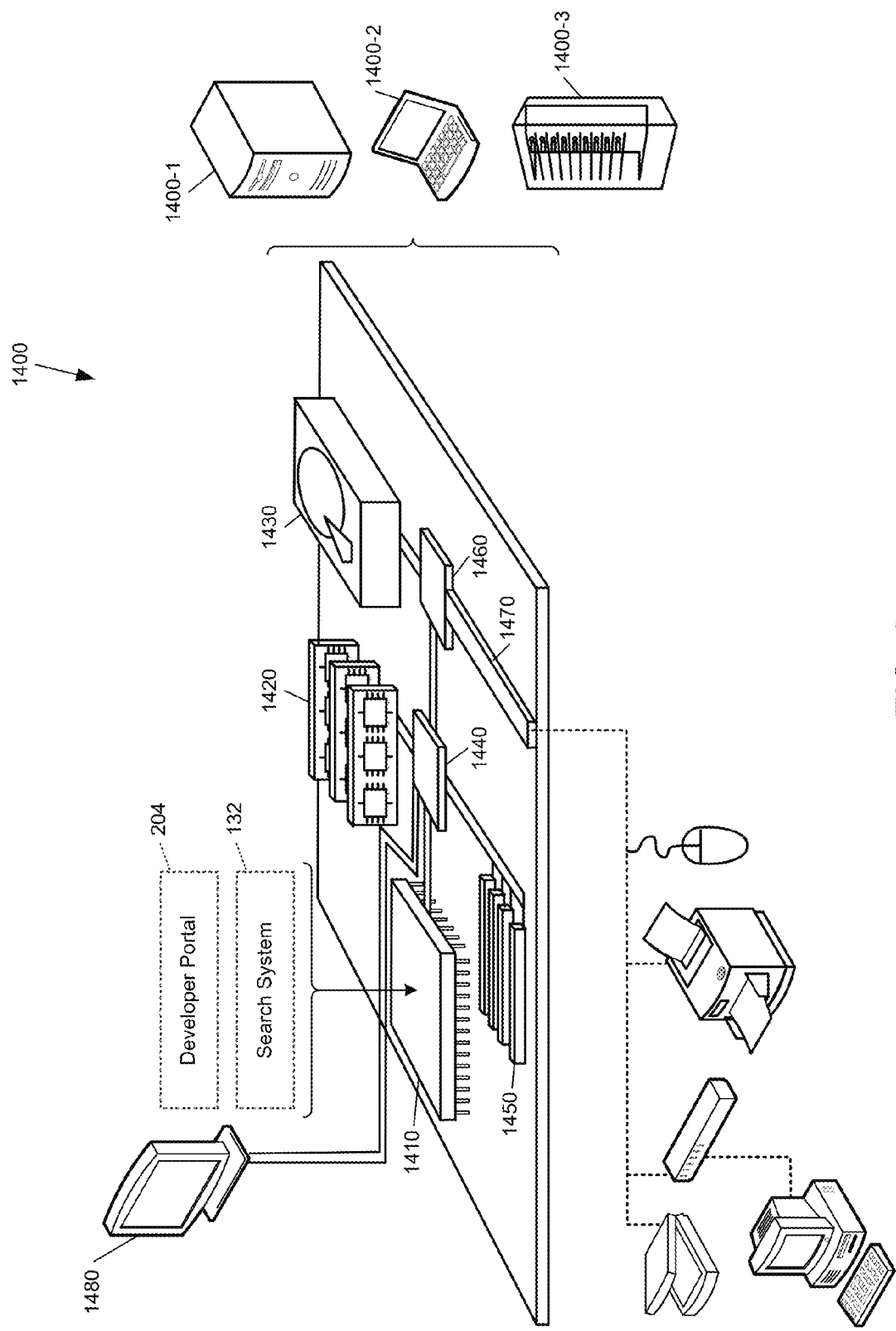
FIG. 15 is a schematic view of an example computing device.

FIG. 15 is a schematic view of an example computing device 1400 that may be used to implement the systems and methods described in this document. The computing device 1400 is intended to represent various forms of digital computers, such as laptops, desktops, workstations, personal digital assistants, servers, blade servers, mainframes, and other computers. The components shown here, their connections and relationships, and their functions, are meant to be exemplary only, and are not meant to limit implementations of the inventions described and/or claimed in this document.

The computing device 1400 includes a processor 1410, memory 1420, a storage device 1430, a high-speed interface/controller 1440 connecting to the memory 1420 and high-speed expansion ports 1450, and a low-speed interface/controller 1460 connecting to low-speed bus 1470 and storage device 1430. Each of the components 1410, 1420, 1430, 1440, 1450, and 1460, are interconnected using various busses, and may be mounted on a common motherboard or in other manners as appropriate.

The processor 1410 can process instructions for execution within the computing device 1400, including instructions stored in the memory 1420 or on the storage device 1430 to display graphical information for a graphical user interface (GUI) on an external input/output device, such as display 1480 coupled to the high-speed controller 1440. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1420 stores information non-transitorily within the computing device 1400. The memory 1420 may be a computer-readable medium, a volatile memory unit(s), or non-volatile memory unit(s). The memory 1420 may be physical devices used to store programs (e.g., sequences of instructions) or data (e.g., program state information) on a temporary or permanent basis for use by the computing device 1400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1430 is capable of providing mass storage for the computing device 1400. In some implementations, the storage device 1430 is a computer-readable medium. In various different implementations, the storage device 1430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1420, the storage device 1430, or memory on processor 1410.

The high-speed controller 1440 manages bandwidth-intensive operations for the computing device 1400, while the low-speed controller 1460 manages less bandwidth-intensive operations. Such allocation of duties is exemplary only. In some implementations, the high-speed controller 1440 is coupled to the memory 1420, the display 1480 (e.g., through a graphics processor or accelerator), and to the high-speed expansion ports 1450, which may accept various expansion cards (not shown).

In some implementations, the low-speed controller 1460 is coupled to the storage device 1430 and low-speed expansion port 1470. The low-speed expansion port 1470, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1400-1 or multiple times in a group of such servers 1400-1, as a laptop computer 1400-2, or as part of a rack server system 1400-3.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus.

The computer readable medium can be a machine-readable storage device, a machine-readable storage substrate, a memory device, a composition of matter generating a machine-readable propagated signal, or a combination of one or more of them. The terms "data processing apparatus", "computing device", and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment.

A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A system of one or more computing devices, the system comprising:
   a user interface presented to a first application developer;
   a data store configured to store information identifying a plurality of functions, wherein each of the plurality of functions corresponds to external functionality available from third party applications;
   an app functionality management module, implemented by a first one or more processors, configured to receive a selection from the first application developer of a first function of the plurality of functions to supplement functionality of a first application under development by the first application developer; and
   a code generation module, implemented by a second one or more processors, configured to provide a software development kit (SDK) library to the first application developer for incorporation into at least a first screen of the first application, wherein the first screen includes a first user interface element associated with a first entity, and wherein the SDK library includes instructions for:
      in response to user selection of the first user interface element during execution of the first application, preparing a query wrapper including a combination of (i) a predefined text string corresponding to the first function and (ii) a name of the first entity;
      transmitting the query wrapper to a search system;
      receiving a result set from the search system, wherein the result set includes a plurality of items, and wherein a first item of the plurality of items includes (i) an identifier of a target application and (ii) an access mechanism for a specified screen of the target application;
      displaying the plurality of items; and
      in response to user selection of the first item, actuating the access mechanism to open the target application to the specified screen.

2. The system of claim 1 wherein the access mechanism specifies downloading and installing the target application from a digital distribution platform prior to opening the target application.

3. The system of claim 1 wherein the first item includes a second access mechanism, wherein the second access mechanism specifies opening a web edition of the target application to the specified screen.

4. The system of claim 1 wherein the access mechanism includes a script to navigate from a default screen of the target application to the specified screen of the target application.

5. The system of claim 1 wherein the query wrapper includes a concatenation of the predefined text string and the name of the first entity.

6. The system of claim 1 wherein the code generation module is configured to (i) provide a specification of the first user interface element to the first application developer and (ii) provide a function call from the first user interface element to the SDK library, wherein the first app developer provides the name of the first entity in the function call.

7. The system of claim 1 further comprising a user interface customization module configured to adjust visual properties of the first user interface element in response to choices made by the first app developer.

8. The system of claim 1 wherein the user interface includes a web page.

9. The system of claim 1 further comprising an app blocking management module configured to store a blacklist, wherein the blacklist indicates applications and application screens to exclude from the result set.

10. The system of claim 9 wherein the code generation module is configured to incorporate the blacklist into the SDK library, such that the SDK library further includes instructions for at least one of:
    removing application screens matching the blacklist from the result set received from the search system;
    providing the blacklist to the search system as part of the query wrapper; and
    preventing display of application screens from the result set that match the blacklist.

11. The system of claim 9 further comprising a search service communication module configured to provide the blacklist to the search system so that the search system excludes from the result set any application screens identified by the blacklist.

12. The system of claim 1 further comprising a monetization preference module configured to receive a sponsorship interest from the first application developer, wherein the sponsorship interest indicates an offer of payment by the first application developer in response to at least one of:
    display of the first application by a second developer;
    user selection of the first application from a result set displayed by the second developer; and
    installation of the first application by a user in response to viewing of the result set displayed by the second developer.

13. The system of claim 1 further comprising a monetization preference module configured to receive payment details from an advertiser, wherein the system provides compensation to the first application developer according to the payment details in response to at least one of:
    display of a sponsored application screen as part of the result set;
    user selection of the sponsored application screen from the result set; and
    installation of the sponsored application screen by a user in response to viewing the result set.

14. A method of operating one or more computing devices, the method comprising:
    presenting a user interface to a first application developer;
    storing, by a data store, information identifying a plurality of functions, wherein each of the plurality of functions corresponds to external functionality available from third party applications;
    receiving, by a first one or more processors, a selection from the first application developer of a first function of the plurality of functions to supplement functionality of a first application under development by the first application developer; and
    providing, by a second one or more processors, a software development kit (SDK) library to the first application developer for incorporation into at least a first screen of the first application, wherein the first screen includes a first user interface element associated with a first entity, and wherein the SDK library includes instructions for:
       in response to user selection of the first user interface element during execution of the first application, preparing a query wrapper including a combination of (i) a predefined text string corresponding to the first function and (ii) a name of the first entity;
       transmitting the query wrapper to a search system;
       receiving a result set from the search system, wherein the result set includes a plurality of items, and wherein a first item of the plurality of items includes (i) an identifier of a target application and (ii) an access mechanism for a specified screen of the target application;
       displaying the plurality of items; and in response to user selection of the first item, actuating the access mechanism to open the target application to the specified screen.

15. The method of claim 14 wherein the access mechanism specifies downloading and installing the target application from a digital distribution platform prior to opening the target application.

16. The method of claim 14 wherein the first item includes a second access mechanism, wherein the second access mechanism specifies opening a web edition of the target application to the specified screen.

17. The method of claim 14 wherein the access mechanism includes a script to navigate from a default screen of the target application to the specified screen of the target application.

18. The method of claim 14 wherein the query wrapper includes a concatenation of the predefined text string and the name of the first entity.

19. The method of claim 14 further comprising (i) providing a specification of the first user interface element to the first application developer and (ii) providing a function call from the first user interface element to the SDK library, wherein the first app developer provides the name of the first entity in the function call.

20. The method of claim 14 further comprising adjusting visual properties of the first user interface element in response to choices made by the first app developer.

21. The method of claim 14 wherein the user interface includes a web page.

22. The method of claim 14 further comprising storing a blacklist, wherein the blacklist indicates applications and application screens to exclude from the result set.

23. The method of claim 22 further comprising incorporating the blacklist into the SDK library, such that the SDK library further includes instructions for at least one of:
removing application screens matching the blacklist from the result set received from the search system;
providing the blacklist to the search system as part of the query wrapper; and
preventing display of application screens from the result set that match the blacklist.

24. The method of claim 22 further comprising providing the blacklist to the search system so that the search system excludes from the result set any application screens identified by the blacklist.

25. The method of claim 14 further comprising receiving a sponsorship interest from the first application developer, wherein the sponsorship interest indicates an offer of payment by the first application developer in response to at least one of:
display of the first application by a second developer;
user selection of the first application from a result set displayed by the second developer; and
installation of the first application by a user in response to viewing of the result set displayed by the second developer.

26. The method of claim 14 further comprising receiving payment details from an advertiser, wherein the system provides compensation to the first application developer according to the payment details in response to at least one of:
display of a sponsored application screen as part of the result set;
user selection of the sponsored application screen from the result set; and
installation of the sponsored application screen by a user in response to viewing the result set.

27. A non-transitory computer-readable medium storing instructions for execution on a processor of a computing device, the instructions comprising:
in a first application, displaying a first screen including a first user interface element associated with a first entity;
a software development kit (SDK) library including instructions for:
in response to user selection of the first user interface element during execution of the first application, preparing a query wrapper including a combination of (i) a predefined text string corresponding to a first function and (ii) a name of the first entity;
transmitting the query wrapper to a search system;
receiving a result set from the search system, wherein the result set includes a plurality of items, and wherein a first item of the plurality of items includes (i) an identifier of a target application and (ii) an access mechanism for a specified screen of the target application;
displaying the plurality of items; and
in response to user selection of the first item, actuating the access mechanism to open the target application to the specified screen.

28. The computer-readable medium of claim 27 wherein the access mechanism specifies downloading and installing the target application from a digital distribution platform prior to opening the target application.

29. The computer-readable medium of claim 28 wherein the first item includes a second access mechanism, and wherein the second access mechanism specifies opening a web edition of the target application to the specified screen.

30. The computer-readable medium of claim 28 wherein the first item includes a second access mechanism, wherein the second access mechanism is for use when the target application is already installed on the computing device, and wherein the second access mechanism specifies opening the target application to the specified screen without first downloading the target application.

31. The computer-readable medium of claim 27 wherein the access mechanism includes a script to navigate from a default screen of the target application to the specified screen of the target application.

32. The computer-readable medium of claim 27 wherein the query wrapper includes a concatenation of the predefined text string and the name of the first entity.

33. The computer-readable medium of claim 27 further comprising instructions for storing a blacklist and at least one of:
removing application screens matching the blacklist from the result set received from the search system;
providing the blacklist to the search system as part of the query wrapper; and
preventing display of application screens from the result set that match the blacklist.

34. The computer-readable medium of claim 33 further comprising instructions for providing the blacklist to the search system so that the search system excludes from the result set any application screens identified by the blacklist.

35. The system of claim 1 wherein the first one or more processors and the second one or more processors are the same one or more processors.

36. The method of claim 14 wherein the first one or more processors and the second one or more processors are the same one or more processors.

* * * * *